(12) United States Patent
Boitouzet et al.

(10) Patent No.: US 10,538,012 B2
(45) Date of Patent: Jan. 21, 2020

(54) PROCESS FOR PARTIAL DELIGNIFICATION AND FILLING OF A LIGNOCELLULOSIC MATERIAL, AND COMPOSITE MATERIAL STRUCTURE ABLE TO BE OBTAINED BY THIS PROCESS

(71) Applicant: Timothée Boitouzet, Paris (FR)

(72) Inventors: Timothée Boitouzet, Paris (FR); Benjamin Droguet, Brive-la-Gaillarde (FR)

(73) Assignee: Timothee Boitouzet (FR)

( * ) Notice: Subject to any disclaimer, the term of this patent is extended or adjusted under 35 U.S.C. 154(b) by 0 days.

(21) Appl. No.: 16/185,342

(22) Filed: Nov. 9, 2018

(65) Prior Publication Data

US 2019/0077040 A1 Mar. 14, 2019

Related U.S. Application Data

(63) Continuation of application No. 15/781,978, filed as application No. PCT/FR2016/053247 on Dec. 7, 2016.

(30) Foreign Application Priority Data

Dec. 7, 2015 (FR) ..................................... 15 61953

(51) Int. Cl.
*B27K 3/08* (2006.01)
*B27K 5/00* (2006.01)
(Continued)

(52) U.S. Cl.
CPC ............ *B27K 3/086* (2013.01); *B27K 3/0221* (2013.01); *B27K 3/15* (2013.01); *B27K 5/008* (2013.01);
(Continued)

(58) Field of Classification Search
None
See application file for complete search history.

(56) References Cited

U.S. PATENT DOCUMENTS

| | | | | |
|---|---|---|---|---|
| 3,607,355 A | * | 9/1971 | Loeb | B05D 3/068 427/294 |
| 3,750,303 A | * | 8/1973 | Gates | B27B 31/00 34/201 |

(Continued)

FOREIGN PATENT DOCUMENTS

| | | |
|---|---|---|
| CA | 1095663 A | 2/1981 |
| CA | 1186855 A | 5/1985 |

(Continued)

OTHER PUBLICATIONS

Birkel, The surfae impregnation of wood: II. use characteristics of impregnated wood: III. investigations of resin adhesives. (1946). Electronic Theses and Dissertations. Paper 1872.*

(Continued)

*Primary Examiner* — James M Mellott
(74) *Attorney, Agent, or Firm* — Wilson Sonsini Goodrich & Rosati

(57) ABSTRACT

The invention relates to a process for treating a lignocellulosic material, preferably wood, comprising the following steps: (1) soaking of the material with organic fluid in order to dissolve at least 40% and at most 85%, in weight %, of the lignin of the material; (2) washing with organic fluid so as to discharge the dissolved lignin; (3) filling with a filling compound; and (4) finishing, so as to obtain a composite formed of a three-dimensional network of transformed filling compound incorporated into a cellulose and lignin network. The invention also relates to a composite structure able to be obtained in this way, and to any part comprising at least one such structure.

20 Claims, 11 Drawing Sheets

(51) Int. Cl.
  *B27K 3/15*   (2006.01)
  *B27K 3/02*   (2006.01)
  *C08B 1/00*   (2006.01)
  *C08H 8/00*   (2010.01)

(52) U.S. Cl.
  CPC .............. *C08B 1/003* (2013.01); *C08H 8/00* (2013.01); *B27K 2200/10* (2013.01); *B27K 2240/10* (2013.01)

(56) References Cited

U.S. PATENT DOCUMENTS

| | | | |
|---|---|---|---|
| 4,239,906 A * | 12/1980 | Antrim | .................... C08B 1/00 127/29 |
| 4,956,048 A | 9/1990 | Hise | |
| 6,770,168 B1 * | 8/2004 | Stigsson | .................. D21C 1/06 162/24 |
| 2010/0081798 A1 | 4/2010 | Balensiefer et al. | |
| 2011/0220307 A1 | 9/2011 | Duggirala et al. | |
| 2013/0167603 A1 | 7/2013 | Bathurst et al. | |
| 2014/0311201 A1 | 10/2014 | Bathurst | |
| 2016/0010279 A1 | 1/2016 | Hu et al. | |

FOREIGN PATENT DOCUMENTS

| | | |
|---|---|---|
| CN | 1813900 A | 8/2006 |
| CN | 1911612 A | 2/2007 |
| CN | 1985891 A | 6/2007 |
| CN | 101476252 A | 7/2009 |
| CN | 101649125 A | 2/2010 |
| CN | 102704297 A | 10/2012 |
| CN | 102864672 A | 1/2013 |
| CN | 202882247 U | 4/2013 |
| CN | 103993042 A | 8/2014 |
| CN | 104389216 A | 3/2015 |
| CN | 104448585 A | 3/2015 |
| CN | 104651964 A | 5/2015 |
| FR | 2507639 A1 | 12/1982 |
| FR | 2672296 A1 | 8/1992 |
| JP | S6162574 A | 3/1986 |
| JP | H02160986 A | 6/1990 |
| JP | 2010163497 A | 7/2010 |
| JP | 2012009233 A | 1/2012 |
| KR | 100977721 B1 | 8/2010 |
| SU | 1657225 A1 | 6/1991 |
| WO | WO 90/02612 A1 | 3/1990 |
| WO | WO 90/02836 A1 | 3/1990 |
| WO | WO 2010/089604 A1 | 8/2010 |
| WO | WO 2011/112703 A2 | 9/2011 |
| WO | WO 2012/080702 A2 | 6/2012 |
| WO | WO 2013/005104 A2 | 1/2013 |
| WO | WO 2013/066196 A1 | 5/2013 |
| WO | WO 2013/181481 A1 | 12/2013 |
| WO | WO 2014/113884 A1 | 7/2014 |
| WO | WO-2017098149 A1 | 6/2017 |
| WO | WO 2017/136714 A1 | 8/2017 |

OTHER PUBLICATIONS

Preparation of wood pulp by sulfate (kraft) process, found at https://nptel.ac.in/courses/103103029/pdf/mod4.pdf, Feb. 15, 2013.*
Berglund L. et al.; "Lignin-Retaining Transparent Wood", ChemSusChem, 2017, No. 10, pp. 3445-3451.
Berglund L. et al.; "Optically Transparent Wood from a Nanoporous Cellulosic Template: Combining Functional and Structural Performance", Biomacromolecules, 2016, No. 17, pp. 1358-1364.
Berglund L. et al.; "Transparent Wood for Functional and Structural Applications", Royal Society Publishing, Downloaded on Dec. 28, 2017, pp. 1-15.
Fink, S; "Transparent Wood—A New Approach in the Functional Study of Wood Structure", Holzforschung, vol. 46, 1992, No. 5.
Hu, L. et al; "Highly Anisotripic, Highly Transparent Wood Composites", Advanced Materials, 2016, DOI: 10.1002/adma.201600427, pp. 1-7.
Hu, L. et al; "Novel Nanostructured Paper with Ultrahigh Transparency and Ultrahigh Haze for Solar Cells", Nano Letters, 2014, 14, pp. 765-773.
Hu, L. et al; "Transparent and Hazewood Composites for Highly Efficient Broadband Light Management in Solar Cells", 2016, Nano Energy, 26, pp. 332-339.
Hu, L. et al; "Wood Composite as an Energy Efficient Building Material: Guided Sunlight Transmittance and Effective Thermal Insulation", 2016, Adv. Energy Mater., 6, 1601122, pp. 1-7.
International Search Report issued in International Patent Application No. PCT/FR2016/053247, dated Mar. 7, 2017 (4 pages).
Nogi, M. et al; "Optically Transparent Nanofiber Paper", Advanced Material, 2009, 21, pp. 1595-1598.
Norman et al; "CVIII, A New Method for the Determination of Cellulose, Based Upon Observations on the Removal of Lignin and other Encrusting Materials", Biochem. 1933, XXVII, pp. 818-831.
Ritter, George J.; "Distribution of Lignin in Wood" Microscopical Study of Changes in Wood Structure Upon Subjection to Standard Methods of Isolating Cellulose and Lignin, Industrial and Engineering Chemistry, Nov. 1925, vol. 17, No. 11, pp. 1194-1197.
Ganeshram, et al. Synthesis and characterization of phenol formaldehyde resin as a binder used for coated abrasives. Indian Journal of Science and Technology, vol. 6 (6S), Jun. 2013, p. 4814-4823.
Grinins, et al. Investigation of Birch Wood Impregnation with Phenol-Formaldehyde (PF) Resins. Sep. 2018; Conference: 9th European Conference on Wood Modification, At Arnhem, The Netherlands.
Luce, Foster. Delignified Impregnated Wood. Research Engineer, Westcraft, Inc., Los Angeles, California. Oct. 1944: 654-657.
Swedish Standards Institute. SS-EN 13183-1. Moisture content of a piece of sawn timber—Part 1: Determination by oven dry method. Apr. 11, 2003 (This document contains the official English version of the European Standard EN 13183-1:2002).

* cited by examiner

PROCESS FOR PARTIAL DELIGNIFICATION AND FILLING OF A LIGNOCELLULOSIC MATERIAL, AND COMPOSITE MATERIAL STRUCTURE ABLE TO BE OBTAINED BY THIS PROCESS

CROSS REFERENCE TO RELATED APPLICATIONS

This application is a divisional of U.S. application Ser. No. 15/781,978, filed Jun. 6, 2018, which is a 35 U.S.C. 371 National Phase of PCT Application No. PCT/FR2016/053247, filed Dec. 7, 2016, which claims benefit to FR Application No. 1561953 filed Dec. 7, 2015, the disclosure of each of which is hereby incorporated by reference in its entirety.

The present invention concerns a treatment for modifying lignocellulosic material, and any modified lignocellulosic material (qualified as "composite") able to be obtained by this treatment of which the native architecture has been substantially and advantageously preserved. In particular, the invention concerns a process for partial delignification and filling of a structure of lignocellulosic material, and the structure obtained by this process. The lignocellulosic material is preferably wood.

PRIOR ART

It is known that certain mechanical properties of wood, such as the resistance to compression and the resistance to bending, can be modified by impregnation of the wood with at least one monomer and/or polymer. Such wood impregnated with a monomer and/or a polymer is commonly designated a wood composite. It is generally solid wood impregnated superficially, i.e. generally to a small thickness from the surface.

A known method of producing wood composite comprises the immersion of the wood to treat in a fluid such as an aqueous solution, in which is dissolved the monomer and/or the polymer, and the pressurization of the fluid, so as to incorporate the monomer and/or the polymer into the wood. However, such a process is long and requires the use of a high pressure so as to impregnate the wood at depth.

An improvement to this process has thus been sought, for example through use of a partial vacuum. However, no satisfactory solution has appeared, since all the techniques thus envisioned are penalized by their long duration, mainly due to the difficulty of impregnating the pores of the wood at depth.

It is also known to impregnate the wood with methyl methacrylate (MMA) then to polymerize the monomer so impregnated. The polymerization may for example be carried out using high-energy radiation such as laser beams or gamma rays. This method is slow, and the use of high-energy radiation proves to be particularly costly.

Furthermore, is has been proposed in document WO 90/02612 to perform impregnation of wood by a monomer in an acidic or basic (alkaline) medium through use of supercritical fluid (fluid in the supercritical state). This supercritical fluid facilitates the impregnation of the monomer or of the polymer into the porous wood.

A first embodiment proposed in WO 90/02612 comprises the impregnation of wood with an alkaline or acidic medium in the presence of a first fluid maintained in supercritical conditions, the digestion of the wood impregnated by this medium in the presence of a second fluid maintained in supercritical conditions, so as to extract extractive substances and lignin from the wood, which leads to fibers being obtained that are generally discrete, which are separated from the supercritical fluid and from the extractive products. The wood so obtained is recovered then converted into paper.

This first embodiment is solely reserved for wood chips, since it appears that a very large proportion, if not the entirety, of the lignin is extracted from the wood, which leads to destroying the internal architecture of the wood. Thus, in the examples of WO 90/02612, these chips are reduced to the state of pulp once the extractive substances and the lignin have been extracted. The pulp so obtained, in the state of discrete fibers agglomerated into a paste, enables wood board to be formed (of the fiberboard type) of higher quality in terms of mechanical properties relative to the state of the art.

A second embodiment proposed in WO 90/02612 comprises the treatment of a material containing cellulose by a first fluid in supercritical state, so as to extract the extractive substances (but not the lignin) from the material comprising the cellulose; the separation of the supercritical solvent containing the extractive substances from the material, so as to obtain a material comprising fewer extractive substances; the placing in contact of the material containing the cellulose and fewer extractive substances with a second supercritical fluid comprising a polymerizable monomer, in sufficient conditions to enable the impregnation of the monomer into the material; the precipitation of the monomer inside the cellulose; and the polymerization of the precipitated monomer in situ, so as to produce a material containing the cellulose. This material apparently presents improved properties.

This second embodiment is especially reserved for pieces of wood of a certain size. Thus, in the examples, large blocks or logs are treated either with MMA or with styrene However, the two embodiments described in WO 90/02612 do not enable the micro-architecture of the wood to be preserved while enabling a filling material to sufficiently replace the lignin. As a matter of fact, the treatment according to this document either produces practically total delignification, which leads to pulp being obtained, or produces very slight delignification, or even none at all. More recently, document WO 2010/089604 has described the obtaining of parts of lignocellulosic material produced by impregnation of the material with a formulation based on acetic anhydride at acid pH, then impregnation of the material with an aqueous organic product based formulation, followed by pressurization so as to impregnate the two solutions into the material, then heating so as to crosslink the organic material present in the lignocellulosic material so impregnated. This makes it possible to manufacture a piece of hardened lignocellulosic composite material. However, the filling of the piece of material by the organic product can only be partial or even superficial (i.e. to a small thickness from the surface), which means that the treatment of a relatively thick piece cannot give properties of improved mechanical strength properties. There has also been described the production of transparent sheets of "paper" of thickness less than 100 µm (Advanced Materials, 2009, 21, 1595-1598, "*Optically transparent nanofiber paper*", Nogi et al., 2009), in particular through the use of a monomer compound of acrylic resin (tricyclodecane dimethyl dimethacrylate -TCDDMA-). The production process comprises total delignification, which leads to discrete fibers being obtained, which are not organized. These fibers are then treated with resin, before being compressed then crosslinked.

Therefore, the methods known to date for impregnation of wood, or of any other lignocellulosic material, to make a stronger material, are methods which are complicated to implement, relatively costly, and of which the implementation is much too slow to be envisioned realistically for industrial production of a composite material from wood.

Therefore there still remains today the need to have a process for treating a structure of lignocellulosic material; preferably wood, so as to obtain a structure preserving the architecture of the wood, and constituted by a material with improved mechanical properties, in particular in terms of resistance to bending and resistance to compression, relative to the lignocellulosic material before treatment. By "treating a structure of lignocellulosic material", is meant here the treatment of the matter constituting that material.

One of the primary objects of the invention is to mitigate the above-referred to drawbacks of the methods of the state of the art, and in particular to provide a process for treating lignocellulosic material that is simple to implement, which enables a material to be obtained preserving the architecture of the wood and having improved mechanical, chemical and/or optical properties.

SUMMARY OF THE INVENTION

According to a first aspect, the invention is thus directed to a treatment process for treating a structure of lignocellulosic material, the lignocellulosic material being preferably wood, said process comprising the following steps:
(1) at least one step of soaking the structure of lignocellulosic material with at least one organic fluid to dissolve at least 40% and at most 85% by weight % of the lignin present in the material;
(2) at least one step of washing the structure resulting from step (1) with at least one organic fluid so as to discharge the dissolved lignin resulting from the soaking step (1), so as to produce a partially delignified structure;
(3) at least one step of filling the partially delignified structure resulting from the washing step (2) with at least one filling compound, so as to produce a filled partially delignified structure; and
(4) at least one step of finishing the filled partially delignified structure resulting from the filling step (3), so as to obtain a composite material structure formed of a three-dimensional network of transformed filling compound incorporated in a network of cellulose and lignin.

According to a second aspect, the invention is also directed to a composite material structure comprising lignin, hemicellulose, cellulose and at least one filling compound, said structure being capable of being obtained by the implementation of the treatment process according to the first aspect of the invention, in which the composite material forms a three-dimensional network of transformed filling compound incorporated into a structure of cellulose and lignin.

According to an embodiment, in this second aspect, the invention in particular concerns a composite material structure comprising lignin, hemicellulose, cellulose and at least one filling compound, said structure being capable of being obtained by the implementation of the treatment process according to the first aspect of the invention, in which the composite material forms a three-dimensional network of transformed filling compound incorporated into a structure of cellulose and lignin.

Lastly, according to a third aspect, the invention concerns a part comprising at least one composite material structure according to the invention, said part being an item of furniture or part of an item of furniture, a component of a building, an automotive part or an aeronautical part.

The process for treating a structure of lignocellulosic material according to the invention comprises the new and innovative combination of partial delignification of the structure followed by filling with a compound which is stabilized within the structure so lignified. This combination advantageously enables a composite material to be obtained that substantially preserves the structure of the material and is formed by two interpenetrated networks, in which the architecture of the lignocellulosic material has been altered at the nanoscopic scale but has been substantially preserved at the microscopic and macroscopic scales. Therefore, the properties of the lignocellulosic material, which has been transformed by treatment according to the invention into composite material, whether they be mechanical, chemical and/or optical, are notably improved relative to the material before treatment.

Without wishing to be bound by any theory, the applicant considers that this is due to the fact that the composite material comprises molecular bonds between the fibers of the lignocellulosic material that are stronger than those which exist in the lignocellulosic material in the native (or natural) state, in particular via the transformed filling compound. Thus, the composite material advantageously combines the properties of the lignocellulosic material with those of the transformed filling compound (most often of polymer type, whether or not cross-linked) since it is composed of a densified structure of the lignocellulosic material within which the transformed filling compound plays the role of a continuous chemical binder together of the lignocellulosic fibers, by adding points of contact and by filling the volumes of the microporosity and of the nanoporosity. This is more effective than the native lignin network which anarchically binds at points the bundles of cellulose at the nanoscopic scale. This is thus referred to as chemical or physico-chemical anchorage.

The applicant considers that the densified structure also arises from better organization (and thus improved compactness) and an increase in the crystallinity of the lignocellulosic structure compared to that of the native lignocellulosic structure (in which the lignin is generally amorphous).

Thus, ultimately, the composite material comprises a lignocellulosic material of much greater mechanical strength than in the native state. The composite material may be qualified as "hardened". This explains the high qualities of the composite material, and its mechanical, chemical and/or optical properties which are improved relative to the native lignocellulosic material.

DETAILED DESCRIPTION OF THE INVENTION

Definitions

By "architecture" of the lignocellulosic material is meant a hierarchized ensemble, of multi-scale organization, i.e. the macroscopic, microscopic, or nanoscopic scales, providing mechanical solidity to the ensemble. All or part of the structure of lignocellulosic material according to the invention arises from the architecture of the wood, of which a few components are briefly reviewed below.

At the atomic scale, wood comprises approximately 50% carbon atoms, 6% hydrogen atoms and 40% oxygen atoms, as well as traces of inorganic compounds and organometallic complexes. More specifically, wood is composed of 60 to 75% carbohydrates in the form of cellulose and hemicelluloses, as well as 18 to 35% lignin. The hemicelluloses are peripheral inclusions on bundles of cellulose, the lignin, by virtue of its transverse physical and chemical links with the hemicelluloses, anarchically serving as transverse linking between those bundles and thus as bracing for the architecture. At the macroscopic scale, two parts are particularly distinguished in wood: heartwood (duramen), of darker color, and sapwood. These two parts have growth rings in which the wood from spring and the darker wood from summer are distinguished.

The plant cell, constituted by a cavity, the lumen, a wall and intercellular channels for transport of the sap, called pits, is a construction unit at the microscopic scale. In the living state, the cavities of the cells of wood close to the bark of the tree provide the transport of the sap from the roots to the extremities of the tree, while the walls provide the functions of mechanical strength. The cells die progressively with the growth of the tree, henceforth providing only the bracing of the tree. The walls of the cell are constituted by the stacking of three distinct layers (the middle lamella, the primary wall and the secondary wall) with specific physico-chemical properties. Each of the these cell layers is constituted mainly by three polymers: lignin, cellulose and hemicelluloses. Lignin, present principally in the middle lamella of the plant cell wall, attaches the cellulose fibrils together and provides the support for the structure of the wood. The multi-scale architecture of the wood is anisotropic. It provides the mechanical solidity and opacity of the lignocellulosic material ensemble. The architecture and the microscopic and nanoscopic structure of the components depend on the wood considered.

The respective amounts of lignin, cellulose and hemicelluloses are variable according to the wood, the tree and the part of the tree considered. The cellulose is partially semi-crystalline while the lignin is amorphous. The lignin is dark brown in color while the cellulose and the hemicelluloses are instead white in color. These three polymers are interlaced to such an extent that the material has nanoscopic porosity, in which substances called extractives are present. Although anchored in the material (mainly by physico-chemical links), these substances are independent from the network constituted by the lignocellulosic material.

The "extractives" are substances that absorb visible light intensely. Their presence inside porosity implies the existence of a high number of interfaces, which has an incidence on the diffusion and propagation of light radiation within the material. The term "extractives" groups together a large set of substances resulting from secondary metabolites synthesized during the growth of the lignocellulosic material. They are present in relatively low amounts (between 5 and 10% by weight) in the form of mixtures, sometimes complex, and highly variable, which are linked to the nature of the lignocellulosic material. The variability of these substances (in amount and quality) is great. The composition of the soil and the climate of the location of growth of a lignocellulosic material considered greatly influence the chemical identity of this material, including that of its extractives.

The extractives group together substances having structures, functionalities and properties which are very varied, which may be polar or non-polar, hydrophilic or hydrophobic, linear, monoaromatic or polyaromatic. Among the extractives may be cited the following compounds: waxes and fats, terpenes (monoterpenes, diterpenes, triterpenes, sesquiterpenes, diterpene acids) and phenolic compounds (derivatives of phenols, lignanes, stilbenes, flavonoides, biflavonoides, condensed tannins, hydrolysable tannins).

The extractives provide an additional chemical protection for the wood. Indeed, they are often involved in the defense mechanisms of the lignocellulosic material against external attacks, such as fungi, enzymes, xylophagous insects, microbes. They are also at the origin of the smell, in part the color, as well as the length of life intrinsic to the lignocellulosic material.

The architecture of the lignocellulosic material is qualified as "native" (or "natural") when the material, whatever the scale of organization at the level from which observation is made, has similar properties to those encountered in the lignocellulosic material not having undergone any treatment.

The term "chemical anchorage" relates to a molecular bond between two compounds, while the terms "physico-chemical anchorage" relate to a bond of the hydrogen bond type, van der Waals type, ionic type or metallic type between two compounds.

The term "architecture space of the wood" also below more simply called "space" or "volume" (corresponding to a substantial absence of matter) relates to the microscopic cavities of the wood and to the pits which join them, filled with sap in the living cells, but also to the nanoscopic spaces between the interlaced chains of polymers contained in the walls of the cells.

By "structure of lignocellulosic material" is meant according to the invention an object in three-dimensions constituted by lignocellulosic material, and having a certain volume (three-dimensional) of at least 2 cm$^3$ approximately. It is a macroscopic object which has substantially kept the architecture of the native lignocellulosic material. Thus, preferably, the structure of lignocellulosic material comprises at least one dimension of at least 5 mm and at most 40 cm. When the lignocellulosic material is wood, the structure may typically be a cut section of wood (transverse cut, longitudinal cut, radial cut) for example of thickness 5-7 mm or even 15 mm.

More specifically, the structure of lignocellulosic material may be a trimming member, a finishing member or a structure member.

By "trimming member" is meant according to the invention an object in three dimensions of which one of the dimensions, generally the thickness, is very much less than the other two dimensions and typically of at least approximately 0.5 mm, preferably at least approximately 1 mm, still more preferably at least approximately 2 mm and yet more preferably of at least approximately 5 mm.

This object is generally chosen from the group formed by laminae of wood, marquetry elements, coverings, veneer, thick veneer and layers of wood, preferably veneer and thick veneer. It substantially corresponds to the term "veneer", preferably "thick veneer".

By "finishing member" is meant according to the invention an object in three dimensions of which one of the dimensions, generally the thickness, is very much less than the other two dimensions and typically of at least approximately 1 cm, preferably at least 1.5 cm, still more preferably at least approximately 2 cm. This object typically corresponds to the finishing work in building, that is to say that it is chosen from the group formed by cladding, battens, slats, skirting boards, parquets, partitions, panels, roof coverings and joinery work. This substantially corresponds to the term "timber".

By "structure member" is meant according to the invention an object in three dimensions which is typically a construction member, and of which the smallest of the three dimensions is typically at least approximately 10 cm. This object corresponds to the structure (or construction work) in the building, that is to say it is chosen from the group formed by posts, beams, lattice structures and frameworks. This substantially corresponds to the term "lumber". This object also comprises Cross-Laminated Timber (CLT), which are boards constituted by at least three monolayer sheets bonded onto each other and disposed in crossed plies, in other words perpendicularly to each other. In general, CLT boards are composed of 3 to 7 layers of wood of which the orientation of the fibers are crossed. These different layers of wood oscillate between 2 cm and 8 cm in thickness, the board reaching a total thickness varying from 6 cm for the thinnest to 28 cm for the thickest.

By "building member" is meant according to the invention a member from the technical field of building, that is to say a construction member, which is either a trimming member, a finishing member or a structure member.

By "fluid" is meant according to the invention liquid or gas. By "organic" is meant according to the invention mainly containing carbon, hydrogen with oxygen, and nitrogen.

By "soaking" is meant according to the invention that the structure is placed in contact with the organic fluid by the major part, preferably practically the entirety, of its outer surface. Thus soaking does not necessarily mean immersion; it may simply be a partial or total placing in contact with an organic fluid. The soaking may give rise to partial or total impregnation by the organic fluid through the action of at least one of the following forces: diffusion forces, capillary forces, gravity forces, agitating forces external to the compound undergoing the soaking or any other forces acting on the capacity of the fluid to move. The acting together of several of these forces, to produce identical or even opposite effects, is not excluded.

By "green wood" is meant wood still containing molecules of water that are free or linked to the cell network, such as freshly felled wood. Thus, freshly felled wood is wood generally containing 100% relative moisture content, whereas "damp wood" by definition only contains molecules of water in the cavities of the cell network i.e. approximately 30% relative moisture content. The measurement of the moisture content of wood is defined by the National Committee for the Development of Wood (of which the initialism in French is CNDB) as the ratio of the mass of water it contains to its anhydrous mass. It is expressed by the following formula:

Moisture content (%)=[(Humid mass−Anhydrous mass)×100]/Anhydrous mass.

At the time of felling, wood may contain more water than wood-matter; sometimes twice more in certain poplars. The relative moisture content is then greater than 100%. According to the CNDB, the saturation point for wood fibers, below which shrinkage and swelling occurs is of the order of 30% for all kinds. By "dry wood" is meant wood which has undergone treatment to reduce the percentage of water retained in the cell walls, of which the degree of moisture content is in general situated from 0 to 30%.

By "A and/or B" is meant A, or B, or A and B.

By "% weight" is meant the percentage by mass. Unless otherwise stated, any percentage indicated in the present description is a percentage by mass.

Lignocellulosic Material

Particularly preferably, the lignocellulosic material is wood. This wood may, according to the invention, be green wood, damp wood or dry wood. For example it may be wood used after possible storage for a period of greater or shorter length (a few days to a few years). This wood may have been transformed after felling, that is to say have been cut up, cut to length, planed, freed from its bark, from its sapwood or from its heartwood, or be engineered wood. It is particularly advantageous according to the invention to be able to treat green wood or even damp wood since this makes it possible make non-negligible saving of a prior drying step for the wood.

It may also be aged wood, that is to say wood already having served for example as construction wood. Thus the method of the invention advantageously makes it possible to recycle, and thus add value to, construction wood.

Practically all kinds of wood, also called wood families, of which the lignin content is comprised between 15 and 35%, preferably between 18 and 32%, and still more preferably between 20 and 30%, by weight, may be treated by the process according to the invention, whether they belong to the family of the angiosperms or of the gymnosperms, whether they are high-value wood of oak or ash type, or more conventional wood used in furnishings or even in the building sector (construction) for example furnishing wood such as ash, construction wood such as pine, beech or Douglas fir or more malleable wood used for turning wooden parts or for model-making such as poplar or certain species of balsa.

Softwood may thus be cited such as that of gymnosperms, preferably fir, pine, Douglas fir, or hardwood such as *tilia*, poplar, *robinia pseudoacacia*, alder or willow. More generally, softwood is chosen from the group formed by Norway pine, pine, spruce, yew, larch, fir, arolla pine, Douglas fir, monkey puzzle, juniper, cedar, *sequoia*, thuya and cypress.

Hardwood is chosen from the angiosperms, preferably from the group formed by alder, birch, balsa, beech, ash, *eucalyptus*, cottonwood, hevea, poplar, aspen, willow, *robinia pseudoacacia*, oak, mahogany, guatambu, korina, meranti, *tilia*, chestnut, maple, horse-chestnut, elm, hazel, walnut, Osage orange, plane tree, sycamore, apple, pear, lemon and tulip tree, and more preferably alder, birch, balsa, beech, ash, *eucalyptus*, cottonwood, hevea, *robinia pseudoacacia*, oak, mahogany, *tilia*, chestnut, maple, horse-chestnut, elm, hazel, walnut, Osage orange and plane tree.

Each kind so cited may comprise a great many species. Thus the pine kind for example covers more than a hundred species such as the maritime pine or the Scots pine; the oak kind covers numerous sub-kinds, such as red oak (known as American oak) or pedunculate oak (known as European oak).

Each kind of wood has an architecture and a chemical identity (that is to say respective amounts of lignin and hemicelluloses, a length of cellulose fibers, and extractives) which are specific to it. Within the same tree, the different parts of the wood (such as the sapwood or the heartwood) may also have different physico-chemical properties according to the kind considered.

However, the lignocellulosic material may also be any material formed by a three-dimensional network of cellulose, and lignin, for example such as straw, natural textiles (such as linen and hemp), the entire forestry biomass, including bamboo, high-yield pulp, paper, cardboard, and cotton, provided that material is in the form of a structure having a certain mechanical strength and a micro-architecture suitable for enhancement by a filling compound which partially replaces the lignin. This material generally also comprises at least one polysaccharide. Such a list comprises the fibrous components (that is to say containing fibers in the native state), such as hemp or linen, but also the fibered components (that is to say transformed products containing an addition of fibers) and annual grasses.

Optional Prior Treatment Step

According to the invention, the soaking step (1) may be preceded by a prior treatment step, generally to partially extract extractives, comprising at least one sub-step of pre-soaking a structure of lignocellulosic material with at least one organic fluid, generally to dissolve part of the extractives present in the material; followed by at least one sub-step of pre-washing of the structure resulting from the pre-soaking sub-step, with at least one organic fluid, so as to discharge the dissolved compounds resulting from the sub-step of pre-soaking.

The structure of lignocellulosic material resulting from the prior treatment step is the structure which will be treated by the treatment process according to a first aspect of the invention.

Each of these pre-soaking and pre-washing sub-steps may be repeated one or more times according to need, independently of the other step provided the final sub-step is a pre-washing sub-step.

This prior step advantageously makes it possible to dissolve extractives, by release of the anchorage links, in particular physical ones, then to extract them.

This prior step advantageously makes it possible to facilitate the partial delignification during the later steps of soaking (1) and washing (2) according to the invention.

The sub-step of pre-soaking enables a controlled and partial extraction of the extractives present in the lignocellulosic material. It is possible for the extraction not to be made homogenously within the lignocellulosic material, in particular according to the operating conditions of this sub-step and the nature of the lignocellulosic material. For example, in the case of the preferred lignocellulosic material, wood, wood from spring is often more sensitive to the pre-soaking sub-step than wood from summer.

This sub-step advantageously makes it possible to keep sufficient extractives within the lignocellulosic material to preserve the architecture of the lignocellulosic material, but also to chemically weaken the architecture of the lignocellulosic material so as to facilitate the action of the organic fluid at the soaking step (1), in other words to facilitate the later partial delignification. Thus, at the atomic scale, week interactions of hydrogen bond or van der Waals type between the bracing polymers and the extractives are destroyed, which makes the structure more accessible for a later alteration at the nanoscopic scale. Similarly, at the microscopic scale, certain pits are widened and the later penetration of organic fluid is thereby facilitated.

The pre-soaking sub-step is generally carried out in operating conditions similar to those of the soaking step (1) described below, in conditions enabling the desired partial extraction of the extractives from the structure of the lignocellulosic material.

A preferred embodiment is however the use of an osmotic process, carried out by the use of an osmotic pressure between two miscible organic fluids placed in contact. In such a case, a first pre-soaking organic fluid is directed to saturating the structure of the lignocellulosic material in a first phase, then in a second phase, this structure so saturated is placed in contact with a second pre-soaking organic fluid. The osmotic pressure between the two fluids creates a spontaneous movement of the two fluids towards each other for a return to equilibrium by a mixing of the two fluids. This causing to move of the two organic fluids results in part of the extractives being driven to the outside of the structure, which is ultimately placed in solution in a mixture composed of the two fluids, generally in a proportion of 50%-50% by volume.

In the case of the osmotic process, it is preferred for the structure of lignocellulosic material to be dry (that is to say at a relative moisture content of 0 to 30%) before it is placed contact with the first fluid of the pre-soaking sub-step, and for this placing in contact to be carried out under a vacuum and with heating. The structure thus saturated is also preferably placed in contact under a vacuum and with heating with the second fluid of the pre-soaking sub-step.

The first and the second fluid of the pre-soaking sub-step are advantageously either both aqueous, or both non-aqueous, so as to promote their miscibility.

A greater difference in properties between these two fluids, such as a difference of solvent, pH, salinity, and/or of the possible compound or compounds placed in solution in that organic fluid generally makes it possible to attain a faster return to equilibrium.

For example, a first pre-soaking solution was constituted by ethanol, in which is steeped a sample of lignocellulosic material placed in a vacuum and at ambient temperature for 8 h. The sample was next placed in contact with a second aqueous pre-soaking solution containing caustic soda at pH=12, under a vacuum and at a constant temperature of 70° C. for 1 h. The sample so obtained was washed by 3 to 4 series of hot water at 40-50° C. and aqueous solution of caustic soda at pH=12, until transparent washing water was obtained.

As is apparent to the person skilled in the art, the amount and nature of the extractives dissolved in this pre-soaking sub-step depends on the nature of the lignocellulosic material, but also on the nature of the two organic fluids of this sub-step.

However, this pre-soaking sub-step may specifically target certain extractives, in which case certain solvents may be preferred. For example, it may be desired to selectively extract hydrosoluble or liposoluble compounds. More particularly, the fact of partially extracting liposoluble compounds, such as fats, may promote *hydrophilia* within the structure of lignocellulosic material, and therefore facilitate the later steps (1) and (2) if these are carried out by means of an aqueous organic fluid. Similarly, the fact of partially extracting hydrosoluble compounds, such as waxes or sugars, may promote hydrophobia within the structure of lignocellulosic material, and therefore facilitate the later steps (1) and (2) if these are carried out by means of a non-aqueous organic fluid.

The pre-washing sub-step enables the extraction of the dissolved extractives present in the lignocellulosic material further to the pre-soaking sub-step. This sub-step in particular serves to avoid limitation, by the presence of the extractives dissolved within the structure, of the action of the organic fluid, and thus of the delignification, during the soaking step.

The pre-washing sub-step may be carried out in similar conditions of implementation to those for the washing step (2) described below. Thus, the fluid of the pre-washing sub-step may be any organic fluid used during washing step (2) described below.

For example, the pre-washing sub-step may be carried out in a vacuum and at ambient temperature using an aqueous solution alternatingly with an aqueous solution of caustic soda at pH=12, the alternating being carried out every 15 min, this sub-step taking 1 hour in total.

The extractives, such as terpenes, which are dissolved then extracted from the structure of lignocellulosic material by the prior treatment step of the invention may advantageously be exploited in the context of the process of the invention, in an exploitation step specific to each family of dissolved molecules, typically from an industrial standpoint, for example for the manufacture of a chemical compound in the pharmaceutical or cosmetic industry. For some of these exploitations, the extracted compounds must undergo post-treatment steps, such as fractionation and/or purification.

Soaking Step (1)

The soaking step (1) enables the partial and controlled dissolving of part of the lignin present in the material, that is to say a partial delignification.

It is possible for the delignification not to be made homogenously within the lignocellulosic material, in particular according to the operating conditions of steps (1) and (2), and the nature of the lignocellulosic material.

The partial delignification according to the invention excludes obtaining a pulp of lignocellulosic material fibers.

The soaking step (1) makes it possible both to keep sufficient lignin (in native form or in a form regenerated after recombination of the radicals formed on degradation of the lignin) within the material to preserve the architecture of the native lignocellulosic material, and to extract sufficient lignin by virtue of the organic fluid to release space, within the architecture of the lignocellulosic material, into which the filling compound of step (3) will become inserted. Thus, the presence of residual lignin within the structure does not limit the filling of the existing microscopic or nanoscopic spaces, nor of those newly created in steps (1) and (2), by the filling compound during the filling step. Such a limitation could strongly inhibit the propagation of the polymer chains by the action of hydroxyl groups (OH) which would block the radicals generated by a polymerization catalyst.

The partial delignification carried out at steps (1) and (2) may, although this is not its primary objective, serve to extract other components of the lignocellulosic material such as the extractives if they have not been extracted during the prior optional step.

The soaking step (1) may be carried out at ambient temperature, or else by heating in the presence of a heat source, at atmospheric pressure, under a vacuum or under pressure or by alternating use of these different conditions, as is known to the person skilled in the art. Generally, the addition of pressure and heat facilitates the action of the soaking fluid and moreover enables the process of hydrolysis of the lignin to be accelerated, which is particularly advantageous for an industrial implementation.

The soaking gives rise to partial or total impregnation by the organic fluid (which may be liquid and/or gaseous) generally by the action of at least one of the following force types: diffusion force, capillary force, gravity force, agitating force external to the structure or any other force acting on the capacity of the fluid to move. The organic fluid may be brought to a sub-critical or supercritical state, according to its nature, as is known to the person skilled in the art.

The soaking step (1) may be carried out on one or more occasions, that is to say that the placing in contact with the organic fluid may be carried out on one or more occasions. Several different organic fluids may be used, alternatingly or simultaneously.

The amount of lignin extracted from the lignocellulosic material depends on the material concerned, depending whether for example it is a softwood, a hardwood or an annual grass.

Thus, if the lignocellulosic material is softwood, it is generally 50 to 85%, preferably 50 to 75%, by weight %, of the lignin present in the structure which is dissolved during the soaking step (1). On the other hand, if the lignocellulosic material is hardwood, it is generally 40 to 60%, preferably 45 to 55%, by weight %, of the lignin present in the structure which is dissolved during the soaking step (1). The person skilled in the art is capable of adapting the conducting of steps (1) and (2) according to the structure of the lignocellulosic material concerned.

The soaking step (1) must enable the desired amount of lignin in the structure to be kept and not to significantly adversely affect the micro-architecture of the lignocellulosic material.

The organic fluid may be any solvent or mixture of organic solvents enabling delignification. Advantageously, all of or some of the organic fluid may be recycled after it use.

According to an embodiment, the organic fluid is a "complex system" composed of a majority solvent, called primary or main solvent, and at least one minor solvent, called cosolvent. The cosolvent is a liquid compound added in a small amount and is most often miscible with the primary solvent. The cosolvent generally serves to improve the solvation power of the primary solvent in relation to the species to dissolve.

The parameters of the primary solvent (i.e. pH, dielectric constant, ionic force, acidity, basicity, oxidizing or reducing character) may be adapted by addition of at least one compound enabling specific solvation properties. An acid, a base, an oxidizing agent, a reducing agent, and/or for instance a salt may also be added to the organic fluid in proportions conferring upon them a solute or cosolvent function, according to their physico-chemical state.

If the main solvent is water, the complex system is an aqueous solution (also called solution), containing water and at least one solute, which may be a cosolvent and/or a dissolved solid component, such as a salt.

The complex systems may be systems that are miscible, micellar or biphasic and may themselves be used in a mixture and/or in series.

According to an embodiment, the organic fluid may be:
(i) an acidic or basic solution which may be aqueous or non-aqueous;
(ii) an acidic or basic oxidizing solution which may be aqueous or non-aqueous;
(iii) a pure ionic liquid;
(iv) an ionic liquid in a mixture with a cosolvent;
(iv) an ionic liquid containing one or more enzymes;
(iv) an ionic liquid in a mixture with a cosolvent containing one or more enzymes;
(iv) an ionic liquid in a mixture with a cosolvent and a fluid;
(iv) an ionic liquid in a mixture with a cosolvent and a fluid and containing one or more enzymes;
(v) a fluid containing at least one biological organism such as bacteria, microbes or fungi;
(vi) and any combination of the components (i) to (vi).

The first compound cited of each component (i) to (vi) of the list is generally present in the majority, that is to say at 50% at least by weight.

According to an embodiment, the organic fluid of soaking step (1) is an organic solution, which may have any pH. Preferably, the organic solution is acidic, generally of pH less than 6.5, still more preferably less than 4.5, or else basic, of pH greater than 7.5, still more preferably of pH greater than 9.5.

In addition to water, the organic fluid of washing step (2) may contain any liquid conventionally used as a solvent in chemistry. The preferred cosolvents and pure solvents are generally chosen from the group formed by ethyl acetate, butyl acetate, methyl acetate, ethyl acetoacetate, acetone, acetic acid, citric acid, formic acid, nitric acid, oxalic acid, methanoic acid, acetic anhydride, butanol, butanone, cyclohexane, cyclopentane, dichloroethane, dichloromethane, dioxane, water, turpentine, ethanol, glycol ether, petroleum ether, diethyl ether, ethylene glycol, heptane, isopropanol, methanol, monoethanolamine, pentane, propanol, propoxypropane, pyridine, toluene, xylene; and mixtures thereof. A non-aqueous solvent is preferably chosen from the group formed by acetone, ethanol, hexane, isopropanol, heptane and mixtures thereof.

By "acid" is meant any compound, alone or in a mixture, which is able to release a proton, such as a mineral or organic acid, in the liquid state or in the form of a dissolved solid salt. We may thus cite the carboxylic acids, salts derived from carboxylic acids and acid anhydrides such as the non-phenolic organic acids such as acetic acid, ascorbic acid, benzoic acid, boric acid, carbonic acid, citric acid, cyanic acid, dichloroacetic acid, formic acid, hydrazoic acid, vitriol, lactic acid, nitric acid, oxalic acid, perchloric acid, propionic acid, hydrogen cyanide; the phenolic organic acids: benzoic acid, cafeic acid, chlorogenic acid, ferulic acid, gallic acid, gentisic acid, parahydroxybenzoic acid, paracoumaric acid, protocatechic acid, vanillic acid, salicylic acid, sinapic acid, syringic acid, phenol acid, resorcinol; mineral acids: hydrochloric acid, chloroacetic acid, hydrobromic acid, bromoacetic acid, hydrochloric acid, hydrofluoric acid, hypobromous acid, hypochlorous acid, hypoiodous acid, iodic acid, iodoacetic acid, phosphoric acid, phosphorous acid, selenic acid, sulfurous acid, sulfuric acid, telluric acid, tribromoacetic acid, trichloroacetic acid, trifluoroacetic acid, aqua fortis; and mixtures thereof.

By "base" is meant any compound, alone or in a mixture, which can accept a proton, in the liquid state or in the form of an inorganic salt placed in solution. We may thus cite the amines, amides, alkaline salts such as sodium acetate, sodium amide, 3-amino-3-methylpentane, ammoniac, aniline, azetidine, bromopyridine, butyl lithium, cadaverine, 2-chlorophenol, 3-chlorophenol, 4-chlorophenol, choline, cyclohexylamine, lithium diethylamide, diethylamine, diisopropylamine, dimethylamine, 2,4-dimethylimidazole, 1,2-dimethylaminoethane, 1,2-dimethylpyrrolidine, ethylamine, ethanediamine, ethanolamine, sodium ethanoate, potassium ethanoate, hexamethylenediamine, hexylamine, hydrazine, sodium hydride, barium hydroxide, calcium hydroxide, iron hydroxide, lithium hydroxide, magnesium hydroxide, potassium hydroxide, sodium hydroxide, hydroxylamine, methylamine, 2-methyl-2-butanamine, 3-methyl-1-butanamine, methylglycine, 1-methylpiperidine, monoethanolamine, n-butylamine, nitrophenols, N-methylpyrrolidine, N-methylpyridinamine, 3-pentanamine, pentylamine, piperidine, propylamine, 1,3-propanediamine, 4-pyridinamine, pyridine, pyrrolidine, sec-butylamine and tert-butylamine, triethylamine, and mixtures thereof.

By "oxidizing compound" is meant a compound, alone or in a mixture, which has an oxidizing action, that is to say which is capable of capturing one or more electrons. This oxidizing compound may be a derivative of chlorine chemistry, such as sodium chlorite, calcium chloride, sodium chloride, dichlorine, bleach, calcium hypochlorite, sodium hypochlorite, any peroxide compound such as hydrogen peroxide, or for instance any compound derived from the prior action of a peroxide compound on another molecule, such as a peroxy acid, resulting from the reaction of a peroxide, such as hydrogen peroxide, and an acid. Peroxide compounds are compounds of general formula ROOR', where each of R and R' is a hydrocarbon chain such as an alkyl, alkyloyl, alkyloxycarbonyl, aryl, aryloyl, or aryloxycarbonyl and mixtures thereof, which may or may not be substituted. Examples of hydrocarbon chains are: for an alkyl chain: methyl, ethyl, propyl, butyl, t-butyl, and pentyl, for an alkyloyl chain: ethyloyl, propyoyl, butyloyl and pentoyl; for an alkyloxycarbonyl chain: the carbonate esters such as ethyl, propyl, butyl, pentyl carbonate; for an aryl chain: phenyl, benzyl, chlorobenzyl, naphthyl, thienyl, indolyl; for an aryloyl chain: phenyloyl and naphthyloyl; for an aryloxycarbonyl chain the carbonate esters such as phenyl or naphthyl carbonate.

Such an oxidizing compound may be added to an acid or a base described above so as to produce an oxidizing acidic solution or a oxidizing basic solution according to the invention. The acids and bases may in certain cases themselves present oxidizing properties, but it is possible to add to them an oxidizing compound to reinforce this property. According to the invention, an oxidizing compound added to the acidic or basic compound may react independently or form new reactive entities. Thus, for example, a peroxide may be associated with a carboxylic acid to form a peroxy acid, such as formic peracid, acetic peracid or persulfuric acid.

By "reducing agent" is meant a compound, alone or in a mixture, which has a reducing action. Thus we may cite aldehydes, sodium dithionite, hydroquinone, sodium hydride, sodium sulfite, sodium thiosulfate. The family of the aldehydes comprises in particular ethanal, propanal, butanal, pentanal, furfural; and mixtures thereof.

Such a reducing agent may be added to an acid or a base described above. Preferably, the organic fluid of soaking step (1) may be chosen from:
  an oxidizing acidic aqueous solution comprising a mixture of an acetic acid solution or and an oxidizing agent such as hydrogen peroxide, or an acidic aqueous solution comprising hydrogen bromide, sulfuric acid or phosphoric acid;
  an oxidizing aqueous solution comprising a mixture of a basic solution such as sodium hydroxide, an aqueous liquid comprising monoethanolamine, or potassium hydroxide with an oxidizing agent such as sodium chlorite.

The organic fluid may also be an ionic liquid and/or a "biological organism" such as an enzyme, a bacterium, a microbe or a fungus.

By "ionic liquid" is meant according to the invention any solution of organic salt of which the melting point is less than 100° C., being generally liquid at ambient temperature, and having a low vapor pressure, that is to say a boiling point comprised between 200° C. and 400° C.

A preferred ionic liquid according to the invention, used alone or in a mixture, is preferably chosen from the ionic liquids with an amino cation such as the cations cholinium, imidazolium, N-methyl-2-pyrrolidinium, pyridinium, and pyrrolidinium and mixtures thereof, preferably imidazolium. The counterion is preferably chosen from the anions acesulfamate, acetate, bromide, chloride, formate, and mixtures thereof, preferably the anions acesulfamate, acetate, bromure, and formate, and mixtures thereof. Particularly preferably, the cation is of the type 1-alkyl-3-alkyl imidazolium, wherein the alkyls comprise, each independently of each other, from 1 to 6 carbon atoms per molecule, for example such as 1-butyl-3-methyl imidazolium or 1-ethyl-3-methyl imidazolium. Thus, the ionic liquid according to the invention may be chosen from 1-ethyl-3-methyl imidazolium acesulfamate, 1-butyl-3-methyl imidazolium acetate, 1-ethyl-3-methyl imidazolium acetate, 1-butyl-3-ethyl imidazolium bromide, 1-butyl-3-methyl imidazolium bromide, 1-ethyl-3-methyl imidazolium bromide, cholinium glycine, cholinium lysine, N-methyl-2-pyrrolidinium acetate, pyridinium formate, pyrrolidinium acetate, pyrrolidinum formate and mixtures thereof. Ionic liquids still more preferred according to the invention are 1-butyl-3-methyl imidazolium acetate, 1-ethyl-3-methyl imidazolium acetate, 1-butyl-3-ethyl imidazolium bromide, 1-butyl-3-methyl imidazolium bromide, 1-ethyl-3-methyl imidazolium bromide, and mixtures thereof.

The ionic liquid may also be an ionic liquid produced from an amino acid such as cholinium glycine or cholinium lysine. Such a compound has the advantage of a lower impact on the environment.

The ionic liquid may also be synthesized from a molecule resulting from one of the steps of the treatment process according to the invention, in particular the soaking step (1). This advantageously makes it possible to optimize the sub-products generated during said process. Thus, we may cite ionic liquids synthesized from aromatic aldehydes produced from lignin or hemicelluloses, such as vanillin, p-anisaldehyde and furfural, which are chemically modified, in particular to insert therein nucleophilic nitrogen atoms.

The advantage of using an ionic liquid is, in addition to the ease of use of such a product within the treatment process according to the invention, being able to re-use it once it has been extracted in washing step (2) and made free of the dissolved components such as lignin and any other product including any other washing organic fluid.

Any enzyme, or any mixture of enzymes, called "enzyme cocktail", any biological organism, such as any bacterium, any microbe or any fungus which can facilitate the degradation of lignin within the material and thus lead to the partial delignification of this material is also able to be used in the context of the invention.

Enzymes, bacteria, microbes or fungi are generally transported by a fluid, which is most often a liquid, and more generally a solution. This carrier fluid which may itself be transported by another fluid, which has different characteristics, the ensemble thus forming most often a complex system, which is miscible, micellar or biphasic.

The enzyme may be a laccase, a peroxydase, a lignase or a ATPase Among ATPases, we may cite "copper-exporting P-type ATPase A" (copA). Among peroxydases, we may cite the "dye-decolorizing peroxidases" including those of type B (Dyp-B type), of type P (Dyp-P type) and of type 2 (Dyp-2 type). They are alone or in the form of mixtures of enzymes.

Such enzymes may be secreted by a fungus in culture such as "white-rot fungi". The role of the enzymes may be dual. More particularly, the partial delignification is "assisted" if the enzyme action is that of the washing organic fluid. It is "complemented" if the enzyme action accompanies the action of the washing organic fluid, by reducing the dissolved solvated components produced from the lignin of the lignocellulosic material into components of lower molecular weight.

At least one fungus may also be used. It is to be noted in this case that the germs of fungi are active over time and develop filaments of mycelium within plant cells.

Another preferred embodiment of the soaking step (1) concerns the use of at least one supercritical fluid most often in a mixture.

By "supercritical fluid" is meant a fluid in the supercritical state. The supercritical state is a state in which the angle of contact of the compound with a substrate is equal to zero, which means that the compound fully wets its substrate: thereby, the supercritical fluid makes it possible to help the lignocellulosic material to be filled by the other compound or compounds of soaking step (2) with which it forms a complex system.

The supercritical fluid may be chosen from among carbon dioxide, water, alkenes with a low molecular weight (that is to say with a number of carbon atoms of at least 1 and strictly less than 5) such as ethylene or propylene, the alkanes with a low molecular weight (that is to say with a number of carbon atoms of at least 1 and strictly less than 5) such as methane, ethane, propane and mixtures thereof; the alcohols with a low molecular weight (that is to say with a number of carbon atoms of at least 1 and strictly less than 5) such as methanol, ethanol, acetone, ammoniac, chloroform, chlorotrifluoromethane, nitrous oxide, trichlorofluoromethane, and mixtures thereof.

The use is however preferred of fluid for which the carbon footprint is minimum, such as water or carbon dioxide. The supercritical state of carbon dioxide may be attained by relatively gentle conditions, that is to say beyond 31° C. and 7.4 MPa (74 bars). Supercritical conditions are more difficult to attain for water (beyond 374.3° C. and 22.1 MPa, i.e. 221 bars): water may also be used in a more accessible state, close to the supercritical state, called sub-critical, equally preferred.

The organic fluid of soaking step (1) may also be chosen from:
- an aqueous solution comprising a mixture of sodium chloride and sodium hydroxide, or an aqueous liquid comprising monoethanolamine, or a basic solution comprising KOH (for alkaline delignification);
- an aqueous solution comprising a mixture of acetic acid and hydrogen peroxide, or an acidic solution comprising HBr, $H_2SO_4$ or $H_3PO_4$ (for acidic delignification);
- a fluid comprising at least one enzyme, possibly in the presence of at least one ionic liquid or in the presence of at least one ionic liquid and at least one cosolvent (for enzymatic delignification);
- a pure ionic liquid produced from plant material (for delignification by pure ionic liquid);
- an ionic liquid containing one or more enzymes in solution (for delignification by ionic liquid assisted/complemented by enzymatic action).
- an ionic liquid in a mixture with at least one solvent miscible with the ionic liquid, such as ethanol (for delignification of the Organosols type assisted by ionic liquid; in this case the ionic liquid may be in the minority relative to the other miscible solvent or solvents of this mixture);
- an ionic liquid in a mixture with at least one miscible solvent containing one or more enzymes in solution;
- a biphasic system, of which one of the phases is constituted by an ionic liquid, pure or mixed with at least one miscible solvent, such as ethanol, and the other phase is constituted by a supercritical fluid, such as $CO_2$ (for delignification by supercritical fluid assisted by ionic liquid in a mixture or pure);
- a biphasic system, of which one of the phases is constituted by an ionic liquid, pure or in a mixture with at least one miscible solvent, and the other phase is constituted by a supercritical fluid, furthermore containing one or more enzymes in solution in the phase containing the ionic liquid (for delignification by supercritical fluid assisted by ionic liquid in a mixture or pure and assisted/complemented by enzymatic action);

any solution of a pure compound or of a mixture of compounds, containing at least one enzyme; and mixtures thereof.

The first compound of each component of the foregoing list is generally present in the majority, that is to say at 50% at least by weight. Any other compound cited and present in a minority is different from this first compound.

According to a particularly preferred embodiment, the organic fluid of the soaking step (1) is a delignification liquid, which further comprises at least one polarizing agent chosen from the group formed by ethanol, ethylene glycol, methyl ether, N-methyl pyrrolidone, dioxanes, dimethylformamide, diethylene glycol, diethylene glycol dimethyl ether, pyridine, n-butylamine, piperidine, morpholine, 4-picoline, 2-picoline, diethylamine, aniline, acetone, methanol, and mixtures thereof, as well as possibly at least one surfactant chosen from the group formed by ionic surfactants such as cationic, anionic and zwitterionic surfactants and non-ionic surfactants, and mixtures thereof.

The presence of such a polarizing agent advantageously enables better penetration of the filling compound within the structure of lignin and cellulose of the material, during the subsequent filling step (3).

According to a particularly preferred embodiment, the organic fluid of soaking step (1) further comprises at least one surfactant.

The surfactant is generally chosen from the anionic surfactants such as those based on sulfate, sulfonate, carboxylate or phosphate esters; cationic surfactants such as the quaternary ammonium salts; non-ionic surfactants such as the surfactants based on polyethylene oxide and/or propylene oxide, for example such as the family of commercially-available products Pluronic® and Tween®, or based on a fatty acid chain, for example the family of commercially-available products Span® and sugar; zwitterionic surfactants such as amine oxides, for example lauramine oxide, betaines, alkyl amido betaines, sulfobetaines and the derivatives of imidazoline; and mixtures thereof. Surfactants derived from lignin, such as those obtained by sulfonation of lignin, may also be used.

Lastly, the soaking fluid may comprise at least one catalyst of N-oxyl type, such as tetrapropylammonium perruthenate (TPAP), 2,2,6,6-tetramethylpiperidine-1-oxyl (TEMPO), or 2-azaadamantane N-oxyl (AZADO) and derivatives thereof.

For example, the soaking step (1) may for example be carried out under a vacuum using an aqueous organic solution comprising from 5 to 10% of sodium chloride and from 0.01 to 0.5% sodium hydroxide, at a temperature from 50 to 90° C. for 2 to 10 hours, for example at 70° C. for 5 hours.

Washing Step (2)

The washing step (2) enables the extraction of the lignin and other possible dissolved compounds present in the lignocellulosic material further to the soaking step (1). The lignin will be present in the soaking organic fluid, at the end of step (2), most often in the form of fragments. In addition to the molecules resulting from the degradation of lignin, products of degradation of other components of the lignocellulosic material may be found in the organic fluid of washing step (2), such as molecules resulting from the degradation of the amorphous parts of the cellulose, simple sugars produced from the peripheral hemicelluloses, or even certain extractives. As explained above, this step (2) serves in particular to avoid limitation, by the presence of the dissolved compounds within the structure, of the filling of the spaces that exist in the native state and those created during the soaking step (1) by the filling compound during the soaking step (3). It may be carried out one or more times, that is to say in several steps, until extraction is attained that is satisfactory, or even total, relative to the amount of dissolved lignin at the soaking step (1).

For example, if the extraction is carried out by means of successive sub-steps of washing by a liquid organic fluid, the extraction is carried out until there is obtained a washing organic fluid substantially free of lignin and other dissolved compounds. The physico-chemical parameters, such as the temperature and/or the pH, of the organic fluid employed may be adjusted from one washing sub-step to another. In the same way, if the organic fluid of the washing step (2) is a mixture of compounds, the respective amounts of these compounds may be adjusted from one washing sub-step to another.

During soaking step (2), the residues from the delignification are more easily extracted from the pores of the wood by agitating the organic fluid of the washing step (2), or by mechanical or wave action, such as sonic wave action. The dissolved lignin that is extracted from the structure of lignocellulosic material plays an essential role in the context of the process of the invention. As explained above, other compounds may be dissolved and extracted, or even simply extracted, from the lignocellulosic material during the steps of soaking (1) and washing (2).

The organic fluid of washing step (2) is preferably an organic fluid which may be any fluid cited above at step (1).

However, the preferred organic fluid is a liquid chosen from the group formed by acetone, water, ethanol, hexane, heptane, isopropanol and toluene, and mixtures thereof, and still more preferably chosen from the group formed by ethanol, hexane, isopropanol, heptane and mixtures thereof.

Ethanol is particularly preferred, since it enables the cellulose to be protected such that it is preserved in later steps (3) and (4).

For example, the washing step (2) may be carried out under a vacuum using an ethanol bath at 60° C. for 4 hours. The washing step (2) may be carried out by several successive baths of ethanol then hexane.

Advantageously, the organic fluid may be recycled after its use during the washing step (2).

According to the process of the invention, the dissolved lignin recovered from the organic fluid of washing step (2) is preferably used in a process of exploiting the lignin, generally industrially, for the manufacture of a construction material or of a material used in aeronautics or of a packaging material or of a biofuel or of a pharmaceutical compound or of a chemical compound. The lignin can thus be used to exploit it in carbon fiber (by aromatic combination), fibrous concrete, packaging, biofuels (by methanization), medicines, and chemical compounds (ferulic acid, in particular) and flavoring agents (vanillin), and moreover for applications of high added value such as the extraction of aromatic molecules as elementary building blocks in various fields of chemistry (polymers, synthesis of precursors, etc.). The lignin may also be used through different pulps (kraft, paper pulp, alcaline pulp, sulfite pulp, etc.) in the packaging field. This confers the process according to the invention with a character of an "ecological" or "green" process, avoiding as far as possible the production of non-recyclable waste.

It is thus possible, under the invention, as envisioned in the literature, to make use of the lignin so extracted from the organic fluid of the washing step (2) in fields as varied as:
    biorefinery (combustion products, synthesis gas, bioethanol);

products of biological chemical specialties (aromatic derivatives such as vanillin, benzene, xylene, DMBQ (2,6-dimethoxy-1,4-benzoquinone), syringaldehyde, syringol, vanillic acid, sinapinic acid, p-hydroxybenzaldehyde, 3-ethylphenol, 2-methylphenol, 3-methoxycatechol, ferulic acid; gases such as carbon dioxide, carbon monoxide, methane or methanol);

specialty compounds (low-quality carbon fiber or of medium quality for applications such as aerospace, automotive, motorcycles, aircraft, wind turbines, brakes, fishing rods, etc.; additives for asphalt, additives for cement; and emulsifying agents); and diverse and various materials (plastic products such as phenolic resins, epoxy resins, lignin-polyurethane foams; rubbery products such as lignin-polyurethane elastomer coatings; adhesive products; products for wooden boards of fiber board type; animal nutrition products such as tablets or binders; inflammable products such as matches or liquids for barbecues).

Similarly, the extracted compounds other than the lignin are preferably used in an exploitation process, such as a process for exploiting sugars or aromatic or functional substances, generally industrially. For some of these applications, these extracted compounds must undergo post-treatment steps, such as purification and/or fractionation.

Filling Step (3)

The filling step (3) is a step during which the filling (that is to say the action of penetration into the partially delignified structure) of the partially delignified structure by the filling compound is carried out. It may be carried out one or more times. The filling compound must most often have the property of linking to the fibers of the lignocellulosic material still present within the structure, by chemical or physico-chemical anchorage.

Various techniques are possible for this filling, as is known to the person skilled in the art. In general, these techniques are of the in-series type (replacement of a fluid with another fluid per step during a series, repeated several times, successive impregnations, the concentrations of each fluid in filling compound increasing incrementally, such as exponentially), by impregnation, by injection (by vacuum of RTM type or RTM Light type, RTM standing for "Resin Transfer Molding") by infusion (RIFT, standing for "Resin Infusion under Flexible Tooling"), under a vacuum or under pressure, in reactor or autoclave or oven under a vacuum, or any other apparatus which the person skilled in the art knows is able to perform this step.

The settling of the conditions for filling is within the capability of the person skilled in the art.

In the preferred case according to the invention for the use of an autoclave, it may be recommended to alternate phases under a vacuum with phases under pressure to properly impregnate the lignocellulosic material. Indeed, this alternation advantageously forces the filling compound to penetrate the material on account of the pressure difference so created.

In an example embodiment, the filling step (3) comprises a step of impregnation under pressure of the partially delignified structure by a solution comprising the filling compound. This pressure is generally from 0.1 to 2.5 MPa.

The filling step (3) may also be carried out under an atmosphere free of oxygen, either under a vacuum or in the presence of dinitrogen, for a time of a few minutes to 24 hours, for example and preferably from 20 to 24 per 500 mL of volume of filling compound, the volume being adapted to ensure the filling of the structure taking into account the removal of the oxygen present in the cavities of the lignocellulosic material and the possible formulation of the filling compound in case of placing under a vacuum and/or heating.

The filling step (3) of the treatment process according to the invention may be carried out substantially in accordance with two embodiments. These two embodiments may be adapted according to the lignocellulosic material used.

In a first embodiment, the filling compound is a polymer or a co-polymer, whether or not formulated.

In this case, the polymer or co-polymer is generally in the liquid state under the conditions of pressure and temperature of the filling step (3), to carry out the filling step (3) by soaking the partially delignified structure in the liquid co-polymer or polymer.

Preferably the polymer or co-polymer is thermoplastic, and the temperature of the filling step (3) is greater than its glass transition temperature. In this case, the finishing step (4) consists of putting to rest at a temperature less than the glass transition temperature of the polymer or co-polymer. This assumes that the polymer or co-polymer generally has a glass transition temperature greater than the later temperature or use, typically greater than approximately 25° C. (ambient temperature).

Preferably the polymer or co-polymer is chosen from the group formed by polyacrylates, polyamides (such as Nylons® from DuPont), polyesters, fluoropolymers (such as Teflon® from DuPont), polyethylene, polypropylene, polybutene, polystyrene, poly(phenylene oxide), poly(chloride vinyl), poly(vinylidene chloride), polycarbonate, poly(lactic acid), polyethersulfones, polyetherimides, polyaryletherketones; as well as from the group formed by the polymers and co-polymers, not listed above and obtained from the monomers of the second embodiment for which the list is given later.

Cellulose, starch, polypeptides, proteins, as well as polymers derived from these compounds, such as cellulose acetate, starch acetate, whether or not formulated, may be used in this embodiment of use.

In a second embodiment, the filling compound of filling step (3) is a polymerizable monomer present in a monomeric solution or in a monomeric formulation under the conditions of pressure and temperature of the filling step (3). Preferably, the filling compound of the filling step (3), is a polymerizable monomer present in a monomeric solution at the conditions of pressure and temperature of the filling step (3), the monomer solution further comprising at least one catalyst. Such a polymerizable monomer generally leads to the obtaining of a thermoplastic (polymer) or a thermosetting (polymer).

The filling compounds may comprise monomers, in the form of monomeric solutions or even monomeric formulations. The monomeric formulations and solutions may be commercially available products known to the person skilled in the art.

In general terms, it is recommended to avoid the use of a filling compound having the associated risk of generating sub-products that are volatile or not linked to the structure of the composite material.

By "monomeric solution" is meant a mixture of one or more monomers, with or without an agent activating the polymerization of those monomers.

By "monomeric formulation" is meant a monomeric solution containing at least one additional compound. Such an additional compound is generally chosen from oligomers, polymers, copolymers as regards the thermoplastics, or the pre-polymers and the pre-copolymers accompanied by at least one hardener for the thermosetting plastics. This additional compound may also be at least one agent enabling polymerization such as an initiator (for example a biosourced initiator from a biological source such as epichlorohydrin, carboxylic acids, amines, and mixtures thereof), a catalyst, preferably able to be heat-activated or degradable by radiation, a filler, a surfactant, a polymerization inhibitor or retardant, or a chain transfer agent, or a mixture of these compounds.

Most often, the filler is organic or mineral. The mineral filler is generally chosen from the group formed by aluminas, clays, carbon powders, glass beads, diamonds, gypsum, calcium carbonate, mica, perlite, quartz, sand, talc, silica, titanium and mixtures thereof, preferably chosen from the group formed by clays, diamonds, glass beads, gypsum, calcium carbonate, mica, perlite, quartz, sand, talc and mixtures thereof. The mineral filler may be functionalized to increase its dispersion and its stability in the monomeric filling formulation. At least one surfactant may be added for this purpose too.

The catalyst is chosen so as preferably to catalyze a radical polymerization reaction. As is known to the person skilled in the art, this choice is generally dependent upon the mode of polymerization and its control, in addition to the monomer.

The catalyst is preferably chosen from the group formed by the compounds of azo type of formula R—N=N—R' where R and R' are alkyl groups possibly comprising at least one additional function, such as azoisobutyronitrile, peroxides, alkyl (generally comprising from 1 to 6 carbon atoms per molecule) halogenated (that is to say comprising a halogen atom which is chlorine, bromine, iodine or fluorine) compounds, nitroxides, thio carbonyl thio compounds. However, any other catalyst known to the person skilled in the art may also be envisioned, such as ketone peroxide, hydrogen peroxide, peroxycetal, hydroperoxide, dialkyl peroxide, diacyl peroxide, peroxyesters, peroxy dicarbonates, such as benzoyl peroxide, methyl ethyl ketone peroxide, cumene hydroperoxide, potassium persulfate, tert-butyl peroxyneodecanoate, tert-butyl peroxypivalate, tert-butyl peroxy-2-ethylhexanoate, tert-butyl peroxyisobutyrate, 1,1-bis-tert-butylperoxy-3,3,5-trim ethylcyclohexane, tert-butyl peroxylaurate, tert-butyl peroxyisophthalate, tert-butyl peroxyacetate, tert-butyl peroxybenzoate, dicumyl peroxide and di-tert-butyl peroxide and mixtures thereof.

According to an embodiment, the monomeric solution or the monomeric formulation of the filling step (3) may furthermore comprise at least one plasticizer which may be any solvent, any oligomer, any filler, directed to reducing the viscosity of the filling compound and thereby enable better penetration of the filling compound within the lignocellulosic structure of the material.

If the plasticizer is a solvent, this is generally chosen such that it evaporates in large part at ambient temperature so as to limit the emission of the organic compound during the lifetime of the composite material structure. More particularly, the use of monomeric solution or monomeric formulation containing a solvent of low volatility is not preferred in the context of the present invention in that the impregnation of a solvent within the structure of the lignocellulosic material may lead to the creation of non-grafted molecules that are imprisoned in the composite material structure which could be progressively released. If the plasticizer is an oligomer, this is chosen such that it anchors lastingly in terms of the structure so as to avoid any later discharge.

At least one agent for preserving the structure of the final composite material, such as an absorber of UV radiation, may also be added to the monomeric filling formulation. This enables the robustness of the latter in the structure to be improved. Such an agent may be chosen from among the chromophore compounds such as anthraquinone, compounds based on the benzophenone or benzotriazole unit, the diphenyl acrylate unit, or all or some of the compounds extracted during one of the steps of soaking (1) or washing (2), and mixtures thereof.

At least one compound that is fire-retardant, fungicidal, bactericidal, or insecticidal may also be added to reinforce the properties of the final composite material structure. The fire-retardant compounds comprise aluminum trihydrate, antimony trioxide, antimony pentoxide and organophosphorus compounds, and all or some of the compounds extracted during the phase of soaking (1) or washing (2), and mixtures thereof.

According to an embodiment, the monomeric filling formulation further comprises at least one polarizing agent chosen from the group formed by ethanol, ethylene glycol, methyl ether, N-methyl pyrrolidone, dioxanes, dimethylformamide, diethylene glycol, diethylene glycol dimethyl ether, pyridine, n-butylamine, piperidine, morpholine, 4-picoline, 2-picoline, diethylamine, aniline, acetone, and methanol.

The presence of such a polarizing agent advantageously enables better penetration of the filling compound within the lignocellulosic structure.

The monomer is preferably chosen from the monomers produced from petroleum (called petroleum-sourced) among which are the methacrylates, such as ethyl methacrylate, methyl methacrylate, propyl methacrylate, butyl methacrylate, hexyl methacrylate, octyl methacrylate, octyl methacrylate, lauryl methacrylate, 2-ethylhexyl methacrylate, cyclohexyl methacrylate; acrylates such as ethyl acrylate; phthalates such as dialkylphthalates wherein the alkyl comprises for example from 1 to 6 carbon atoms; nitriles such as acrylonitrile; styrene and styrene derivatives such as α-methylstyrene, chorostyrene, styrene, t-butyl styrene, vinyl toluene; vinyl compounds such as vinyl acetate, vinyl chloride and vinyl proprionate; unsaturated compounds containing a carboxyl group such as acrylic acid, fumaric acid, maleic acid, methacrylic acid; ethylene compounds such as ethylene glycol or ethylene oxide; butadiene; isoprene; unsaturated monomers containing a nitrogen atom, such as acrylamide, acrylonitrile, N-butoxydimethylacrylamide, vinylpyridine; and mixtures thereof. These monomers generally lead to the formation of thermoplastic polymers.

We may also cite monomers leading to the formation of thermosetting polymers such as petroleum-sourced compounds among which are precursors of thermosetting resins such as precursors of epoxy resins, such as the pre-polymer epoxide derivatives of bisphenol such as diglycidyl ether of bisphenol A (DGEBA), or any bisphenol epoxide, as well as glycidyl methacrylate or allyl glycidyl ether, the precursors of oxetane resins, the precursors of phenolic resins, the precursors of urea resins, the precursors of acrylic resins; and mixtures thereof. In this case, at least one hardener is generally present in the filling compound. The hardener may be any hardener of thermosetting resin known to the person skilled in the art such as an aliphatic amine, like isophoronediamine, or cyclic amine, a carboxylic acid, an anhydride or an ionic liquid.

We may also cite bio-sourced monomers leading to the formation of thermoplastic or thermosetting polymers, identical to the monomers produced from petroleum or different, among which are the tannins, such as flavan-3-ol (afzelechin, gallocatechin, catechin) and the terpenes; resveratrol resorcinol glycerol and glycerol derivatives such as epichlorydrin, isomers of propanediol and glycolic acid sugar derivatives (isosorbide, sorbitol polyglycidyl ether, trehalose, D-glyceraldehyde, D-threose, D-erythrose, D-arabinose, D-ribose, D-mannose, D-glucose) furfural derivatives (generally resulting from the acidic depolymerization of hemicellulose); derivatives of maleic or fumaric acid lactic and formic acid derivatives; the monomers produced from vegetable oil and fat (cashew nut, safflower, rapeseed, linseed, olive, soya, castor oil) such as sebacic acid (castor), cardanol (cashew nut), linoleic acid (produced from linseed), *vernonia* acid (produced from *vernonia* seeds); hydroxyalcanoic acids, such as those derived from formic, lactic and sebacic acids; bio-ethylene (or biological ethylene); bio-ethylene glycol (or biological ethylene glycol); bio-propylene (or biological propylene); bio-1,4-butanediol (or biological 1,4 butanediol); the derivatives of lignin such as terephthalic acid, gallic acid, vanillin; the derivatives of vanillin such as vanillylamine, diglycidylether methoxyhydroquinone, vanillylamine triglycidylether; and mixtures thereof, such as monomers resulting from a combination of derivatives of sugar and fat.

By "bio-sourced" it is meant to qualify a substance of which all or some of the constituent atoms are produced from a resource coming from biomass, and are not the result of anthropic transformation of a fossil resource.

Lastly we may mention hybrid bio-sourced monomers leading to the formation of thermoplastic or thermosetting polymers, identical to the bio-sourced monomers. By "hybrid bio-sourced" compound is meant a bio-sourced compound of which some of the structure has reacted with a molecule of which the atoms do not come from resources produced from biomass.

By "derivative of X", is meant according to the invention a compound synthesized from compound X by a short sequence of chemical reactions substantially keeping the identity (that is to say the main chemical structure) of compound X, such as an addition of a function or an increase in the length of the carbon chain (i.e. an addition of carbon chain) or an oxidation or a reduction or a nucleophilic substitution or ring-opening.

Still more preferably, the monomeric solution or monomeric formulation, preferably the monomeric solution, preferably comprises at least one monomer chosen from:

monomers produced from petroleum among which are methacrylates, such as butyl methacrylate, methyl methacrylate, ethyl methacrylate, glycidyl methacrylate, tri-n-butyl tin methacrylate; phthalates such as dialkylphthalates; nitriles such as acrylonitrile; styrene and styrenic derivatives such as t-butyl styrene and chorostyrene; vinyl compounds such as vinyl acetate, vinyl chloride and vinyl proprionate; ethylenic compounds such as ethylene glycol or ethylene oxide; butadiene; isoprene; and bio-sourced monomers among which are terpenes; glycerol and glycerol derivatives obtained after reaction with at least one of epichlorohydrin, isomers of propanediol and glycolic acid; derivatives of sugars; furfural derivatives (generally resulting from the acidic depolymerization of hemicelluloses); lactic and formic acid derivatives; monomers produced from castor oil such as sebacic acid; hydroxyalcanoic acids, such as those produced from formic, lactic and sebacic acids; bio-ethylene (or biological ethylene); bio-ethylene glycol (or biological ethylene glycol); bio-propylene (or biological propylene); bio-1,4-butanediol (or biological 1,4-butanediol), lignin derivatives, such as terephthalic acid; and mixtures thereof.

Any mixture of the aforementioned compounds is also preferred according to the invention.

The advantage of using bio-sourced monomers is that it is possible either to recover them later, on recycling the composite material at the end of life, or to facilitate the destruction of the composite material at the end of life. This thus makes it possible to obtain a partially or totally recyclable composite, which confers the process according to the invention a character of a sustainable or even "ecological" or "green" process.

According to an embodiment, the filling compound is constituted by two monomers which lead to the manufacture of a thermosetting polymer in finishing step (4), which constitutes polymerization and cross-linking.

An example of a second embodiment is that the filling step (3) comprises a diffusion step comprising a first sub-step of immersion of the partially delignified structure in a mixture of 50% of the monomeric solution and 50% of a solvent, for example ethanol, then a second sub-step of immersion of the structure resulting from the first sub-step in a mixture of 75% of the monomeric solution and 25% of a solvent, for example ethanol, then a third sub-step of immersion of the structure resulting from the second sub-step in a mixture of 100% of the monomeric solution, then a fourth sub-step of immersion of the structure resulting from the third sub-step in a mixture of 100% of the monomeric solution and catalyst, each immersion sub-step being carried out at ambient temperature for from a few minutes to 24 hours, for example for 24 hours.

According to an embodiment, the filling step 3) may advantageously be carried out in the presence of a neutral gas such as dinitrogen or argon under pressure or else a supercritical compound (i.e. in the supercritical state).

The catalyst is as described above.

The neutral gas advantageously makes it possible to avoid the evaporation of the filling compound during the steps of filling (3) and finishing (4), as well as to avoid the contact of said compound with ambient air, and in particular the oxygen of the air.

According to an embodiment, the monomer is such that once polymerized, it substantially possesses the same optical density as that of cellulose. The refractive index of the polymer so obtained is typically comprised within a range of from 1.35 to 1.70, more particularly between 1.44 and 1.65, and still more particularly between 1.52 and 1.60, and often taken around 1.47, 1.53, 1.56 or 1.59, with a possible variation around these values of the order of 10%. It may also be, in a different embodiment, typically comprised within a range of from 1.40 to 1.60, for example approximately 1.47.

Finishing Step (4)

The finishing step (4) is a step during which the filling compound of the filled partially delignified structure resulting from the filling step (3) is fixed in the structure, which makes it possible to obtain a composite material structure formed from a three-dimensional network of transformed filling compound incorporated into a network of cellulose and lignin. The "transformed filling compound" is the compound obtained as a result of the finishing step (4). This step is carried out in different ways, in particular according to the embodiment of the filling step (3). It may be carried out one or more times. It may be carried out in a stationary mode or by stages.

This finishing step (4) is thus a step of fixation of the filling compound, preferably by polymerization and/or cross-linking when the filling compound comprises at least one monomer, often present in the form of a filling solution or formulation. This polymerization and/or cross-linking is carried out in particular in such a way that fibers of the lignocellulosic material are also linked to the transformed filling compound after completion of the finishing step (4) by chemical, physical or physico-chemical anchorage.

As explained previously the term "anchorage" relates to the creation of molecular links. The structuring of polymer chains within the architecture of the lignocellulosic material is made either by covalent bonds, in which case a chemically cross-linked network is obtained, or by weak links, of hydrogen bond or van der Waals type, in which case a physical network is obtained, or else by a mixture of the two types of bond.

The filling compound thus forms a polymer which may thus belong to the family of the thermoplastic polymers or the thermosetting polymers. Such polymers may be chosen from the group formed by acrylic resins, aminoplast resins, diallyl phthalate resins, epoxy resins such as Spurr epoxy resins (for example such as the commercially available product EM300 sold by the Sigma-Aldrich company), melamine resins, methacrylic resins, oxetane resins, phenolic resins, polyacetal resins, polyamide resins, aromatic and aliphatic polycarbonate resins, aromatic and aliphatic polyesters, polyfluorinated resins, polyphenylene ether resins, polyimide resins, aromatic and aliphatic polyolefin resins, polysulphonated resins, styrenic resins, and polyurethanes and inorganic or organic sol-gel materials such as Ormosil polymers (for "organically modified silica" or "organically modified silicates"); that is to say silicates or silicas modified organically), silicones, and combinations thereof.

The anchorage of the filling compound is carried out in different ways, in particular according to the embodiment of the filling step (3).

Thus, when the filling step (3) is carried out according to the first embodiment, that is to say that the filling compound is a polymer or a copolymer which is preferably thermoplastic, the finishing step (4) consists of fixation (or fixing), as best possible, of the polymer or copolymer within the structure for its later use. In other words, the finishing step (4) consists of placing said polymer or copolymer in a physical state in which it is practically unable to leave the structure in the conditions of temperature and pressure considered. These conditions of temperature and pressure depend substantially on the later use which will be made of the composite material structure, i.e. typically whether it is intended for exterior placement (in which case the climate of the location of use must be taken into consideration) or interior placement. In general, this results in placing under a temperature lower than the vitreous transition temperature of the polymer or copolymer.

Thus, when the filling step (3) is carried out according to the second embodiment, that is to say that the filling compound is a polymerizable monomer present in a monomeric solution, the finishing step (4) consists of polymerizing the monomer in the presence of the catalyst. This is generally carried out by any polymerization technique that can be envisioned, such as the thermal route, the UV route, or the plasma route. The technical choice depends substantially on the nature of the polymerization catalyst, as is known to the person skilled in the art.

For example, the monomeric solution comprises buytyl methacrylate and styrene in a proportion of one part buytyl methacrylate for 3 parts of styrene, and the catalyst present at the finishing step (4) is azoisobutyronitrile in a ratio of 0.05 part. In this case, the finishing step (4) may be carried out by heating at a temperature of 15° to 80° C., for example 40° C., under a vacuum or under an oxygen-free atmosphere, for example under an oxygen-free atmosphere, for 20 to 50 hours, for example for approximately 24 hours.

When the polymer or copolymer obtained is a thermosetting polymer or copolymer, the filling step (3) is carried out at the liquid state at a temperature greater than the range of temperatures at which the cross-linking is established and said polymer or copolymer begins to harden. Thus, the finishing step (4) consists of polymerization then cross-linking of the source monomers of the thermosetting polymer, at a temperature less than said range of temperatures of the polymer or copolymer.

Thus, it is possible to perform the filling (3) of the lignocellulosic material and to initiate the induced precipitation (4) of the filling compound therein practically simultaneously.

Optional steps of post-treatment (5) and/or (6) According to the invention, the treatment process may furthermore comprise a step of placing under pressure (5) of the structure produced from the finishing step (4) The step of placing under pressure (5) is typically carried out at a temperature of 80 to 250° C. for 5 to 30 minutes under pressure of 0.1 to 2.0 MPa.

This step of placing under pressure (5) may be followed by a step of surface finishing (or surface treatment) of the structure resulting from the step of placing under pressure (5) The surface finishing step (6) may typically be carried out by the chemical route, for example by means of ethyl acetate, or by the thermal route accompanied by placing under a press, in which case the steps of placing under pressure (5) and surface finishing (6) are carried out simultaneously. This advantageously makes it possible to flatten the surface irregularities of the structure.

The surface finishing step (6) can also be carried out without carrying out a step (5) beforehand. In this case, it may be carried out on the basis of vapor treatment with acetone or methylene chloride.

Structure

The composite material structure according to the second aspect of the invention is generally advantageously a structure having good fire-resistance, that is increased relative to the lignocellulosic material before treatment (on account of its increased mass per unit volume and the absence of air—and thus of oxygen—in its densified cellular structure), rot-proof (on account of the absence of air in the densified cell structure which cannot therefore interact with the ambient moisture), of improved durability relative to the lignocellulosic material prior to treatment, and which has mechanical properties of resistance to compression and bending that are improved relative to the native lignocellulosic material prior to treatment. Among other things, these properties depend on the nature of the filling compound and on the native lignocellulosic material.

According to a preferred embodiment, the composite material structure has in major part, or even in its entirety, a substantially homogenous or periodic refractive index, according to the nature of the native lignocellulosic material. According to an embodiment, the composite structure of lignocellulosic material is substantially transparent. However, it may also be opaque. Preferably, the composite structure of lignocellulosic material is substantially translucent.

By "transparent" is meant the capacity of a visually homogenous body to allow at least 90% of incident light to pass through. This measurement is made relative to the transmission of direct light for an ambient illumination considered, by comparison with the value (in lux) of the ambient illumination and the value (in lux) of the luminous transmission flux obtained after passage inside the structure.

By "translucent" is meant the capacity of a body to allow between 5% and 90% of the incident light to pass through. It is possible for a translucent body not to appear homogenous. In the context of the present invention, certain less delignified zones of the part of lignocellulosic material may absorb the incident light rays according to the structure of the native lignocellulosic material; the zones that are most delignified will, on the other hand, tend to appear lighter and to allow light to pass more easily than the less-delignified zones.

By "opaque" is meant the capacity of a body not to allow any light ray to pass, by absorption or by diffusion of the light inside its structure. A structure of native lignocellulosic material is generally an opaque material in its commonly used sizes. If the thickness of this structure is reduced to less than 500 µm, the native lignocellulosic material is then in its fragile flexible sheet form, and may allow incident radiation to pass, and may be translucent thereby, despite the absence of treatment, but the material does not have the other properties of the final composite material.

The light rays passing through the material may or may not be deviated, and may or may not maintain their direction of initial propagation after having passed through the structure. This optical property is advantageously obtained by homogenizing the optical index of the transformed filling compound with that of the cellulose (in particular the alpha-cellulose) determined within the structure of the lignocellulosic material on account of the filling step (3) and by creation of a continuum of material in the finishing step (4). This procures an additional optical quality for the structure, since all or some of an incident radiation may be transmitted through this composite material structure by homogenization of the optical density.

The continuity of the optical indexes is generally not perfect above a certain volume of lignocellulosic structure. To be precise, according to the native lignocellulosic material and the degree of delignification, the extraction of the lignin from the lignocellulosic material may not be uniform depending on its faces and at depth, such that the delignification, and therefore the optical rendition, does not appear to be homogenous. For example, in the case of wood treatment, according to the kinds of wood, the zones of summer wood and spring wood may not have the same nature or not be differentiated. The same applies for the sapwood and the heartwood for certain kinds of wood. It is thus possible, for certain woods, in particular those having annual growth rings (alternation of summer and spring wood), that one of the parts, often the summer wood, is less prompt to undergo the treatment of the steps of soaking (1) and washing (2), thereby leaving zones apparent after treatment by steps (3) and (4) having a greater or lesser degree of translucency or transparency, or even that are opaque. On the contrary, as regards more fragile kinds of wood that are generally chemically homogenous, the reactivity of the structure confronted with steps (1) and (2) may be substantially uniform rendering the material substantially uniformly translucent or transparent. The optical property is generally observed on the composite material structure.

Typically, the composite material structure comprises at least one dimension of at least 2 mm and at most 40 cm. These 40 cm may correspond to the total thickness of a CLT board. It is possible that this may not strictly correspond to the dimensions of the structure before treatment according to the method of the invention. To be precise, dimensional changes may result from the process by a modification of the structure of the lignocellulosic material during steps (1) and (2), for example bringing deformation (slight twisting) or a reduction in the size of the composite material relative to the lignocellulosic material before treatment, with or without a deformation axis having precedence.

The structure of the composite material often has a higher density than that of the native lignocellulosic material, for example from 5% to 1000% greater, or between 10 to 200% greater, this value depending in particular on the lignocellulosic material, the degree of delignification and the nature of the filling compound.

The composite material structure obtained according to the process of the invention is preferably a trimming member, a finishing member or a structure member.

It is to be recalled that there are three types of cut in wood:
LRC (longitudinal radial cut)
TC (transverse cut)
TLC (tangential longitudinal cut).

The applicant has treated all the possible types of cut, even though the following examples only concern the cuts TC and LRC in the samples.

It is to be noted that according to the invention, the transverse and longitudinal cuts, which are the preferred cuts, generally react in similar manner to the process.

The person skilled in the art is capable of determining which cut to prefer for the treatment according to the invention: by way of example, for structural applications taking advantage of the improved mechanical properties, the LRC will be preferred whereas for applications taking advantage of the new optical properties it will be the TC to be preferred.

Part

The part according to the third aspect of the invention may be used in a wide variety of exterior uses, in which case the part is generally chosen from among soffits, window frames, doors and door frames, verandahs, edging planks, garden sheds, terraces (such as exterior decking and exterior pavements) and buildings with wood panels (or wood cladding), urban developments and the like. Alternatively, the part may be used in a wide variety of interior uses, in which case the part is generally chosen from among packaging components for luxury goods, shaping (or design) components, furnishing components (such as furniture and joinery products or even food containers such as food bowls), automotive interior components, interior components for yachts and jets, marine components, sports components (such as skis), components of mass-market goods (such as sunglasses or telephone covers), aeronautical components, and components for the construction sector.

DRAWINGS

The invention will be better understood in the light of the accompanying drawings in which:

FIG. 1 diagrammatically represents the principle of the treatment process according to the invention;

FIG. 2 diagrammatically represents an example of partial implementation of a treatment step of the process according to the invention, said step comprising the immersion of the structure of lignocellulosic material in a liquid;

FIG. 3 diagrammatically represents an example of implementation of the step of placing under pressure of the process according to the invention;

FIG. 4 diagrammatically represents an example of full implementation of the filling step (3) and of the finishing step (4) of the process according to the invention, for the case in which these steps comprise the immersion of the structure of the lignocellulosic material in a liquid according to FIG. 2;

FIG. 5 diagrammatically represents a view by scanning electron microscope (SEM) of a longitudinal cut of wood in the natural state;

FIG. 6 diagrammatically represents a macroscopic view in three dimensions of a structure of wood in the natural (or native) state, before treatment according to the invention;

FIG. 7 diagrammatically represents a microscopic view in three dimensions of the structure of wood of FIG. 6 in the natural (or native) state, before treatment according to the invention;

FIG. 8 diagrammatically represents a view at an intermediate scale of the structure of wood of FIGS. 9 and 10, after the steps of soaking (1) and washing (2) according to the invention;

FIG. 9 diagrammatically represents a macroscopic view in three dimensions of the structure of wood of FIGS. 6 and 7 after the steps of soaking (1) and washing (2) according to the invention;

FIG. 10 diagrammatically represents a microscopic view in three dimensions of the structure of wood of FIG. 9;

FIG. 11 diagrammatically represents a macroscopic view in three dimensions of the structure of wood of FIGS. 9 and 10 after the filling step by a filling compound (3);

FIG. 12 diagrammatically represents a microscopic view in three dimensions of the structure of wood of FIG. 11;

FIG. 13 diagrammatically represents a macroscopic view in three dimensions of the structure of wood of FIGS. 11 and 12 after the finishing step (4), that is to say of the structure of composite wood obtained by the treatment process according to the invention;

FIG. 14 diagrammatically represents a microscopic view in three dimensions of the cut of composite wood of FIG. 13;

FIG. 15 reproduces three photographs taken by scanning electron microscope (SEM) at a semi-microscopic scale of part of a structure of fir at different steps of the treatment process according to the invention, namely from left to right respectively before delignification treatment, after delignification and before impregnation by a monomer compound, and after polymerization of the monomer compound so impregnated;

FIG. 16 reproduces two photographs taken by scanning electron microscope (SEM) after partial enlargement of the part of a fir structure of FIG. 15, that is to say at a microscopic scale, namely from left to right respectively before treatment and after polymerization of the impregnated monomer compound;

Figure 1:
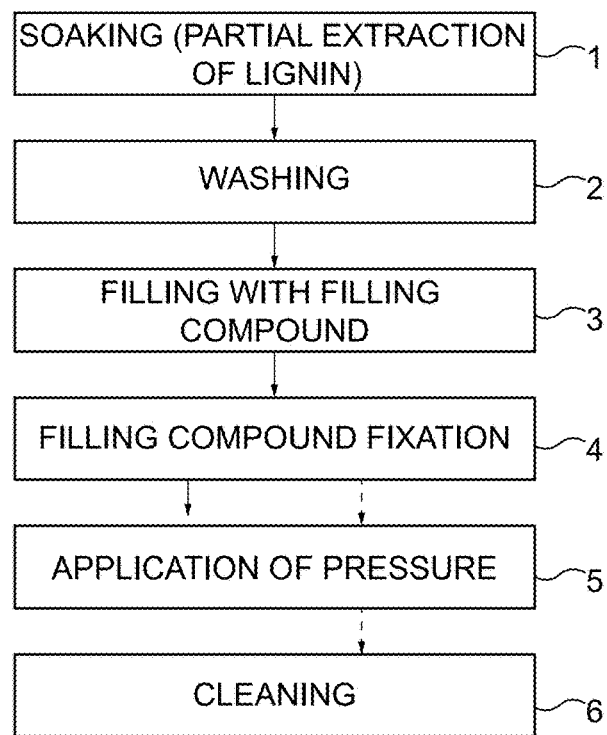

FIG. 1 diagrammatically represents the treatment process according to the invention, by a succession of sub-steps, each being represented by a box. Each of the boxes corresponds to the step bearing the same reference number of the process according to the invention, it being understood that references (5) and (6) are optional steps as shown by the arrows in dashed line linking boxes 4, 5 and 6.

In order, there can thus be distinguished a first step (1) which is a soaking step of the structure of lignocellulosic material. Step (1) performs partial extraction of the lignin of that structure. It is followed by a second step (2) which is a step of washing the structure resulting from step (1), to discharge the dissolved lignin resulting from step (1). This washing step (2) is followed by a third step (3) of filling the partially delignified structure resulting from the washing step (2), by at least one filling compound. The last and fourth step (4) is a step of fixation of the filling compound within the structure resulting from the filling step (3). This makes it possible to obtain a composite material structure formed by a three-dimensional network of transformed filling compound incorporated in a network of cellulose and lignin. This fourth step may be followed by a fifth step (5) of placing under pressure the structure resulting from the finishing step (4), possibly itself followed by a sixth step (6) of surface finishing of the structure (10) resulting from step (5).

Figure 2:
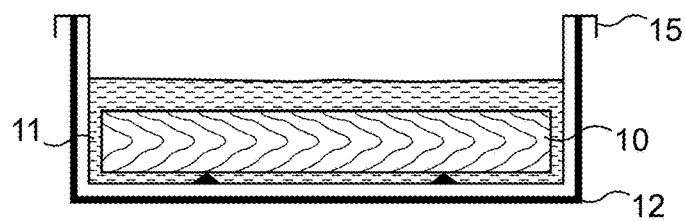

FIG. 2 diagrammatically represents an example of partial implementation of a treatment step of the process according to the invention, said step comprising the immersion of a structure of lignocellulosic material (10) in a liquid. The structure of lignocellulosic material illustrated is a wood structure, for example fir. It is immersed in a treatment solution (11), which may be an organic solution of the soaking step (1), an organic solution of the washing step (2) or a solution comprising at least one filling compound of the filling step (3). The assembly rests on a mounting (15), for example of teflon, which is itself fastened into a tank (12), for example of stainless steel.

Figure 3:
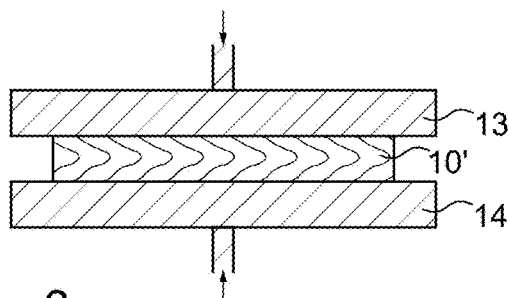

FIG. 3 diagrammatically represents an example of implementation of the optional step of placing under pressure (5) of the process according to the invention. In this case, the composite material structure (10') is compressed in a compression apparatus (13, 14) composed of two symmetrical jaws (13) and (14) able to be brought towards each other while sandwiching the structure (10') as a vise. On each of the parts (13) and (14) an axial force is applied which is opposite the force applied on the other part (the two parts being represented by arrows) so bringing them towards each other.

Figure 4:
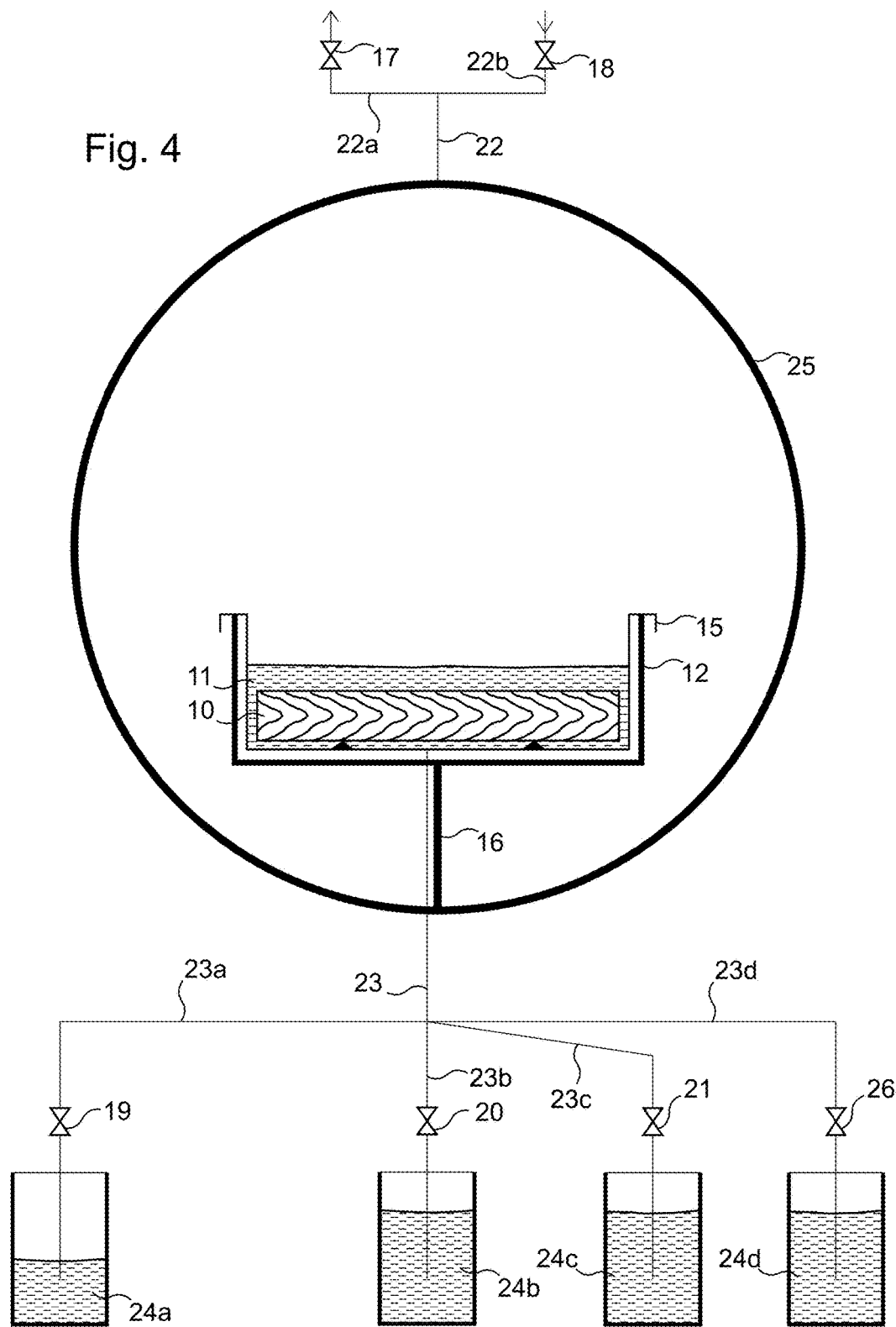

FIG. 4 diagrammatically represents an example of full implementation of the filling step (3) and of the finishing step (4) of the process according to the invention, for the case in which these steps comprise the immersion of the structure of the lignocellulosic material in a liquid according to FIG. 2.

In this Figure, the assembly presented in FIG. 2 is disposed inside a chamber (25). More specifically, the tank (12) is fastened within the chamber (25) by means of a metal mounting (16). The chamber (25) is such that it makes it possible to control the conditions of pressure and temperature which are present within it. These conditions mainly depend on the nature of the filling compound. The chamber (25) may be a vacuum oven or an autoclave.

A pipe (22), which divides into a pipe (22a) and a pipe (22b), makes it possible, by means of respective valves (17) and (18), respectively to create a vacuum or introduce dinitrogen $N_2$ into the chamber (25).

A pipe (23), which divides into a pipe (23*a*), a pipe (23*b*), a pipe (23*c*) and a pipe (23*d*), makes it possible, by means of respective valves (19), (20), (21) and (26), to discharge or introduce a respective solution (24*a*), (24*b*), (24*c*) ou (24*d*) into the chamber. A pure solution (24*a*), (24*b*), (24*c*) or (24*d*), or possibly a mixture of at least two of these solutions (24*a*), (24*b*), (24*c*) and (24*d*), thus constitutes the treatment solution (11) (which may vary according to the step or sub-step of the process considered), in which bathes the wood structure (10). For the carrying out of the filling step (3), this makes it possible to perform a treatment of the wood structure (10) by series, each series comprising successive immersions for example in the order of use of the solutions. The treatment step (3) usually comprises several series, typically from 2 to 6 series, for example 4 series.

It is possible by way of variant to provide the device presented in FIG. 4 with another device comprising as many organic treatment solutions as necessary, each treatment solution being associated with a pipe on which is present a valve, linked to the pipe (23) in direct relation with the chamber (25).

Figure 5:
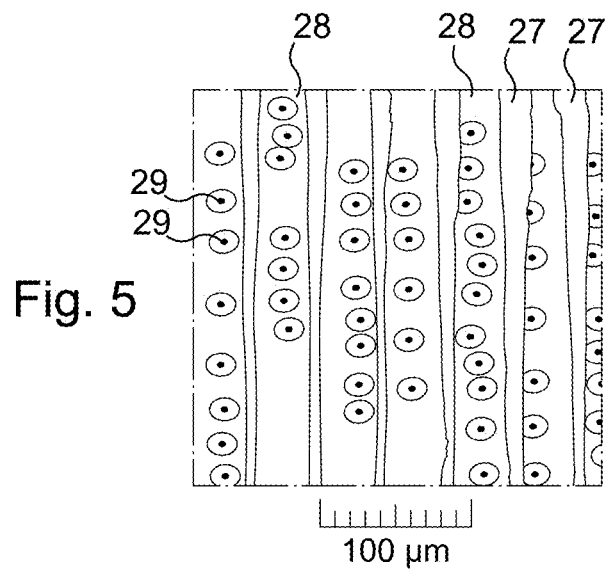

FIG. 5 diagrammatically represents a view from a scanning electron microscope (SEM) of the longitudinal cut of a wood structure, for example walnut, in the natural state. The micro-architecture of the wood can be seen therein. At this scale, it is possible to distinguish the cavities (or "lumens") (28) of cellulose delimited by the walls (27) formed by cellulose fibers, as well as the transverse perforations forming pores or channels (29) between the cell cavities. These cavities have a transverse dimension of 30 to 60 µm for softwoods and 70 to 350 µm for hardwoods. The transverse perforations (29) represent bordered pits for softwoods or substantially circular orifices for hardwoods, of which the transverse dimension varies from approximately 6 to approximately 30 µm, and are on average approximately 15 µm. FIG. 5 substantially corresponds to a cut in the longitudinal direction of the structure represented diagrammatically in FIG. 6.

Figure 6:
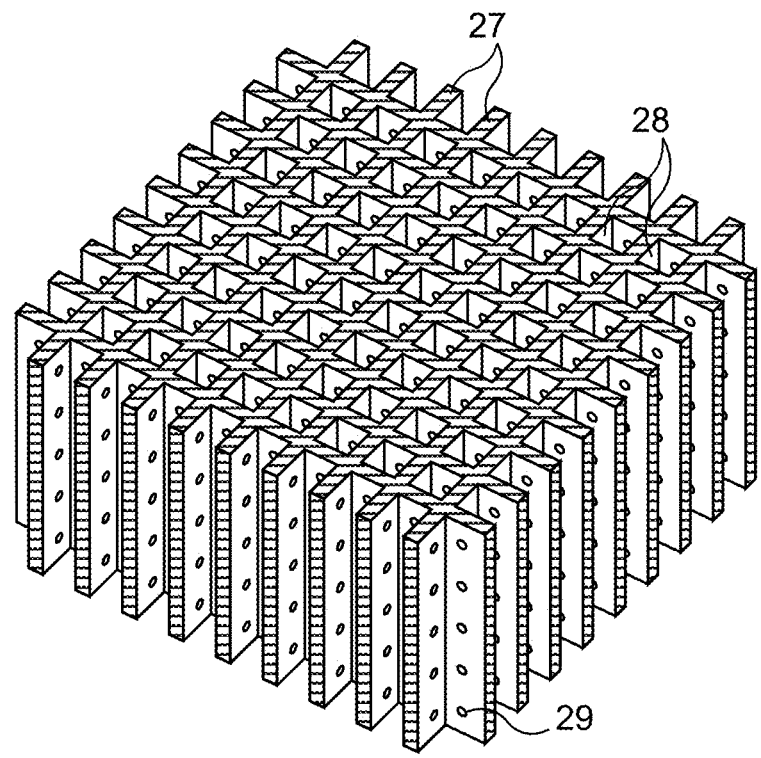
Figure 7:
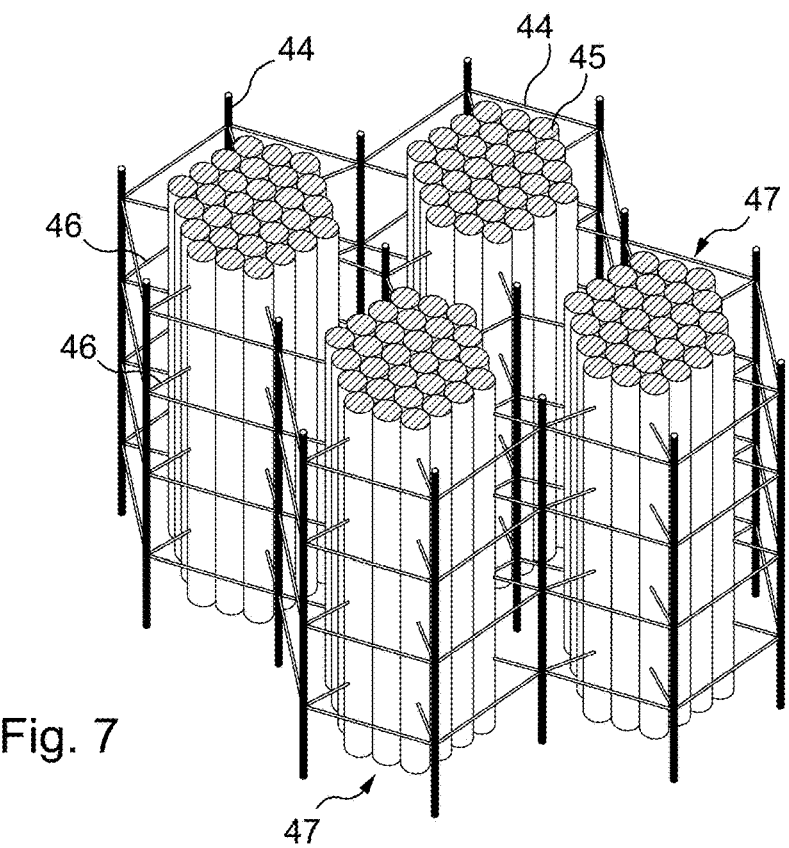

FIGS. 6 and 7 diagrammatically represent two views in three dimensions, which are respectively macroscopic and microscopic, of a wood structure in the natural (or native) state, that is to say before treatment according to the invention. Found therein are the cavities (28) of wood of average size in the transverse direction of approximately 75 µm, with disparities according to the nature of the wood, i.e. of approximately 30 to approximately 60 µm for softwoods, and approximately 70 to approximately 350 µm for hardwoods. These cavities (28) are delimited by cell walls of average thickness of approximately 2 to approximately 10 µm for hardwoods and for softwoods. As can be seen in FIG. 7, the micro-architecture of the wood from which arises the mechanical strength in the natural state comes from the ensemble of the walls of the cell walls (28) which are constituted by tubes or microfibrils (45), themselves formed by bundles or macrofibrils (47). The macrofibrils (47) are linked by chemical links to hemicellulose structures of transverse bracing (46), linked by transverse chemical links to lignin structures of longitudinal bracing (44), this ensemble (46, 44) serving as bracing for the cellulose macrofibrils (47) FIGS. 8, 9 and 10 diagrammatically represent three views in three dimensions, respectively at the intermediate scales between the macroscopic and microscopic, of a structure of wood after the steps of soaking (1) and washing (2) according to the invention.

The cell wall (49) can be distinguished, which is thinned relative to that represented in FIGS. 6 and 7. The thickness of the cell wall (49) is approximately 2 to approximately 10 µm, on average approximately 6 µm. The microfibrils (45), the hemicellulose (46) and the macrofibrils (47) are substantially unchanged relative to FIGS. 6 and 7. The lignin (44') is still present, but "lightened", that is to say in lower quantity relative to the lignin (44) represented in FIGS. 6 and 7.

Figure 8:
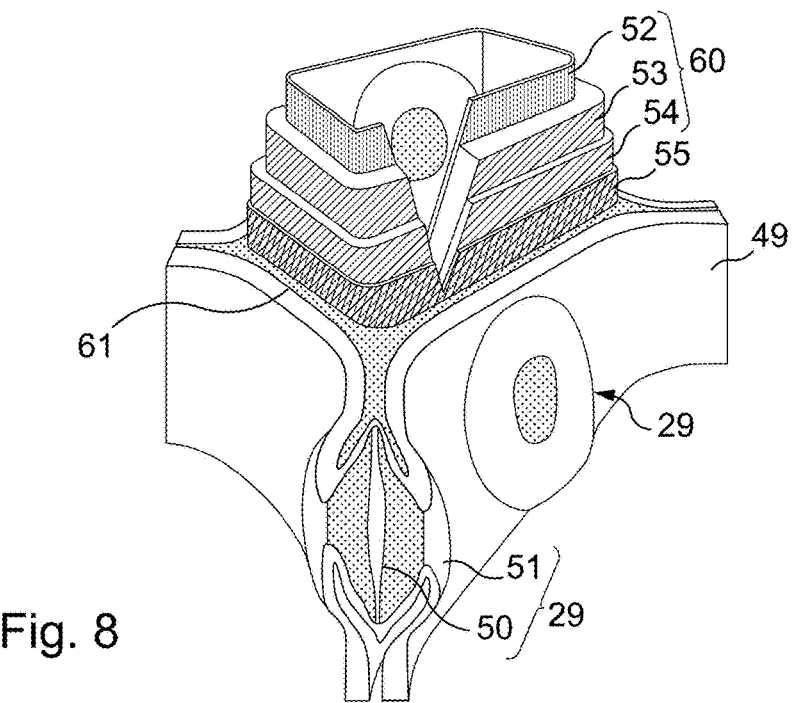
Figure 9:
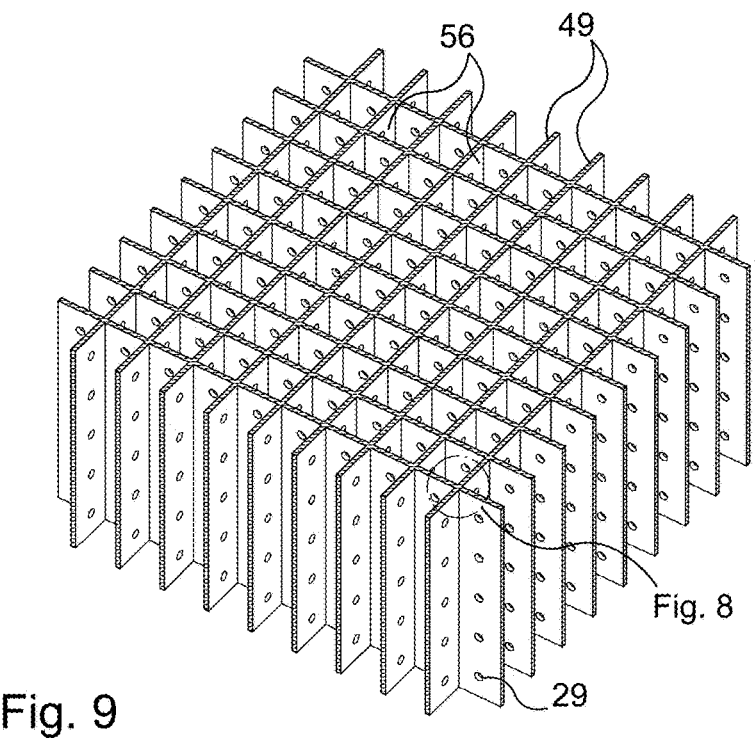
Figure 10:
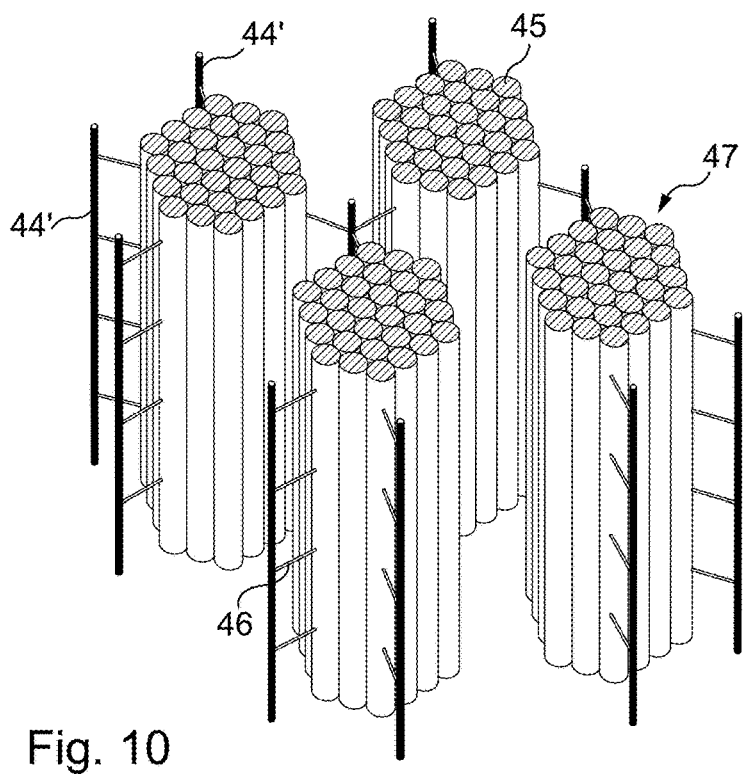

FIG. 8 details the cell wall 49, at a wall junction (see FIG. 9). The cellulose cell wall (49) comprises a middle lamella (61) of thickness approximately 0.2 to approximately 1 µm, as well as two walls, the primary wall (55) of approximately 0.1 µm thickness, and the secondary wall (60), itself constituted by three sub-layers respectively (52), (53) and (54) in the direction from the cavity (28) towards the outside, the first sub-layer (52) being of approximately 0.1 to approximately 0.2 µm thickness, the second sub-layer (53) being of approximately 1 to approximately 5 µm thickness and the third sub-layer (54) being of approximately 0.1 to approximately 0.2 µm thickness. The transverse perforation (29) can also be distinguished, which is constituted by an actual orifice (50), of average dimension approximately 0.02 to 4 µm, surrounded by a perforation (51), of average dimension approximately 6 to 30 µm.

At the time of the partial delignification carried out by the soaking step (1) associated with the washing step (2), the primary wall (65) and the third sub-layer (54) of the adjoining secondary wall (60) have been the most delignified, themselves being the layers or sub-layers most charged in lignin, the third sub-layer (52) itself being very little charged with lignin, having practically not been delignified. This explains the differences in dimensional variations within the structure of the lignocellulosic material which occur on partial delignification according to the invention.

It is to be noted that, by adapting the dimensions indicated above, FIG. 8 could equally well illustrate the material prior to treatment during the treatment steps which are the steps of soaking (1) and washing (2) of the method according to the invention. To be precise, during these steps, the only modification identified arises from the thickness of some of the layers and sub-layers as explained above, which is lessened progressively with the treatment.

Figure 11:
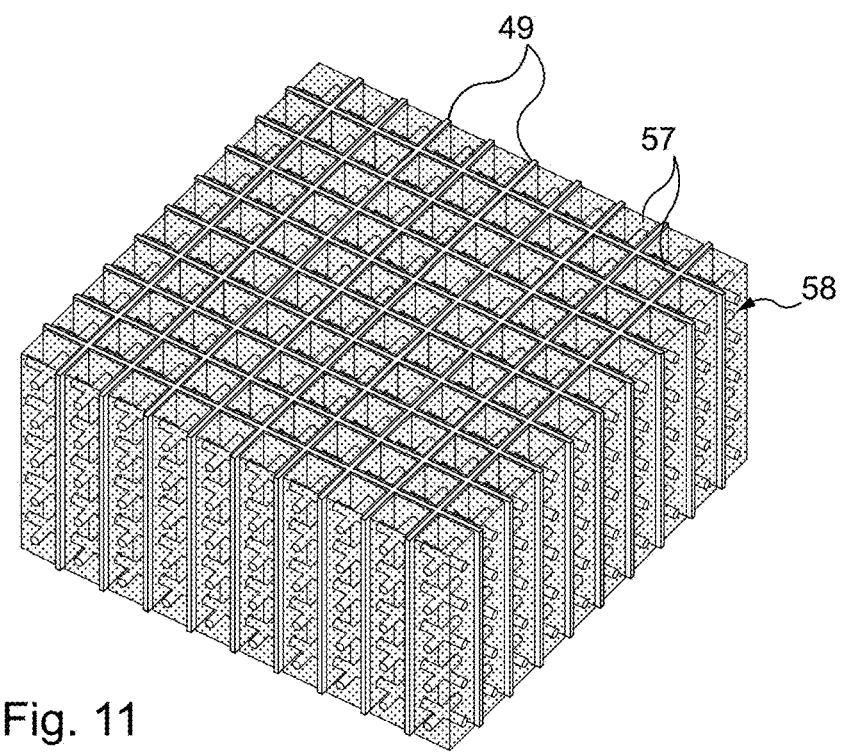
Figure 12:
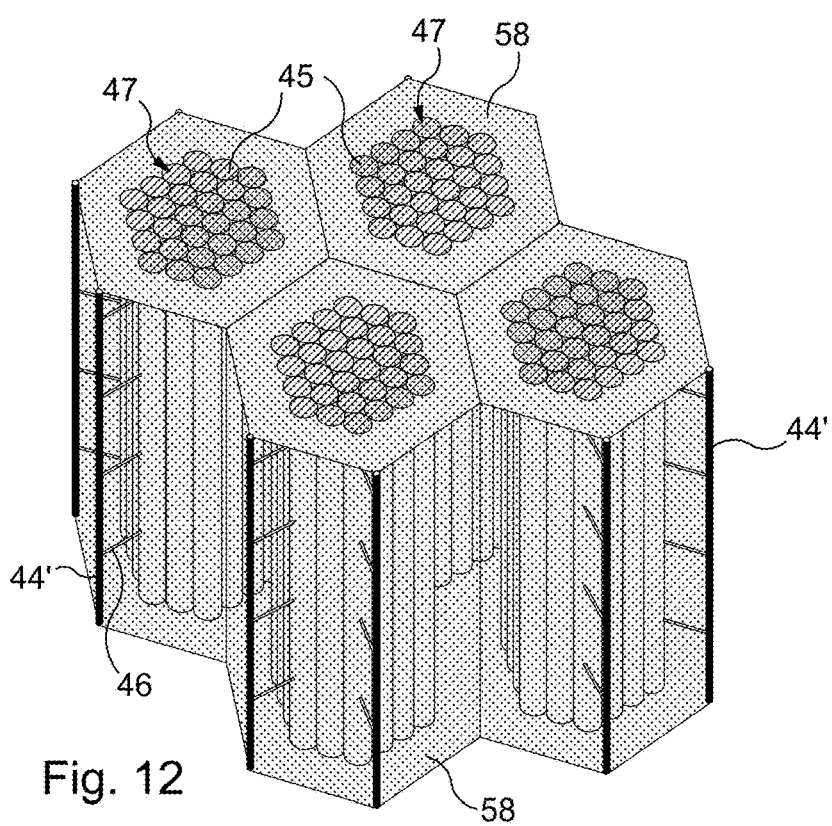

FIGS. 11 and 12 diagrammatically represent two views in three dimensions, respectively macroscopic and microscopic, of the wood structure of FIGS. 9 and 10 after the filling step by a filling compound (3). There can be found therein the microfibrils (45), the lightened structure of lignin (44'), the hemicellulose structure (46), the macrofibrils (47), and the walls (49) of the cavities (57). These cavities (57) are now filled with filling compound, forming a three-dimensional filling network (58). In practice, this amounts to filling the macrofibrils and their interstices with this filling compound, and possibly, the filling of the microfibrils with the filling compound according to the degree of penetration of the filling compound into the material.

Figure 13:
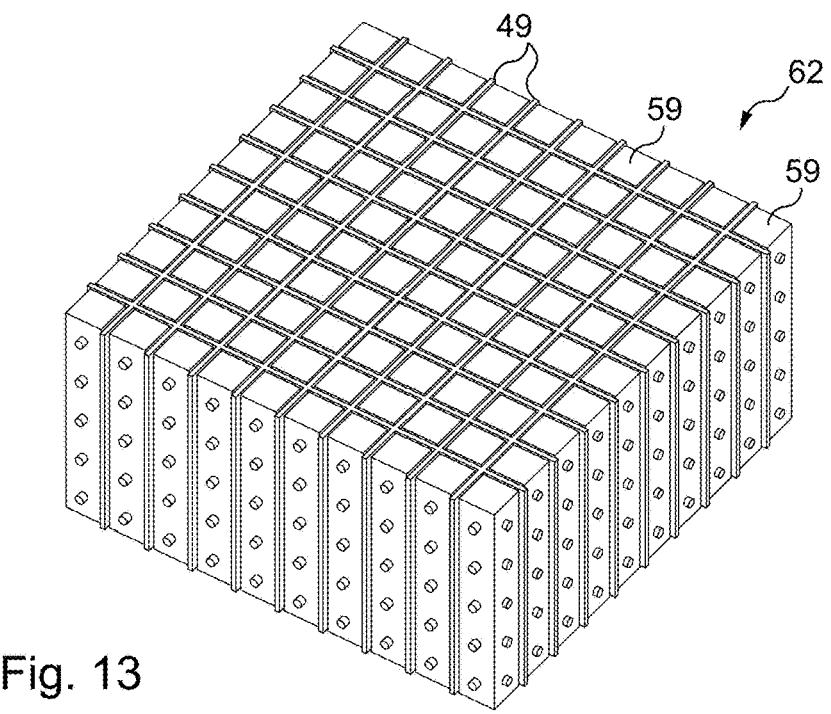
Figure 14:
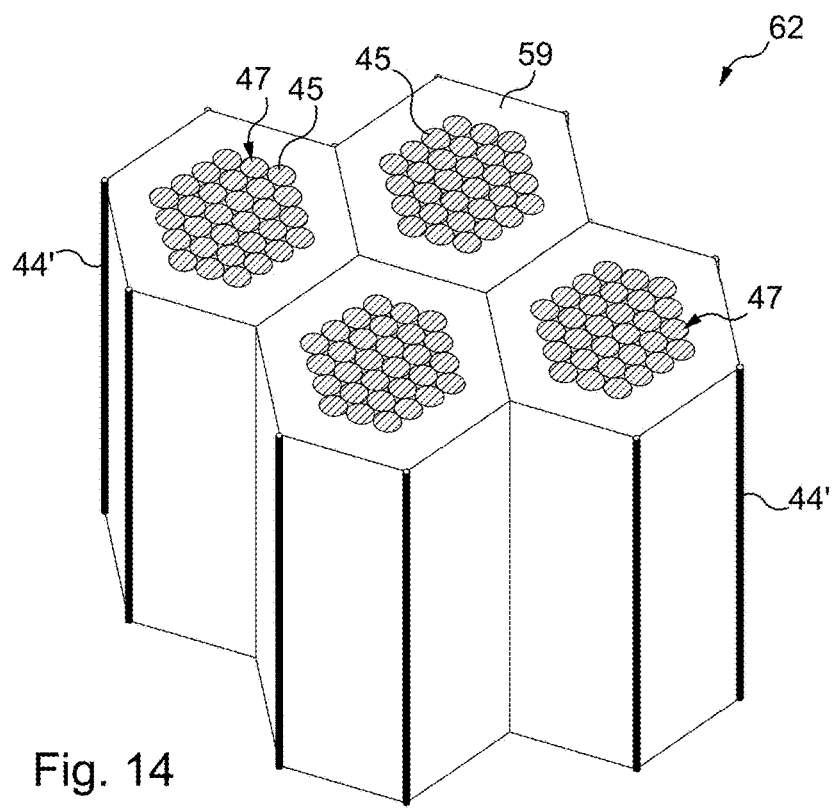

FIGS. 13 and 14 diagrammatically represent two views in three dimensions, respectively macroscopic and microscopic, of the wood structure of FIGS. 11 and 12 after the filling step (4) (generally consisting of polymerization). They thus diagrammatically illustrate the composite wood structure obtained by the treatment process according to the invention. There can be found therein the microfibrils (45), the lightened structure of lignin (44'), the hemicellulose structure (46), the macrofibrils (47), and the walls (49) of the three-dimensional network (59) for filling.

FIGS. 15 to 23 are explained in the examples below.

The invention will be better understood in view of the following example embodiments, with reference to the accompanying drawings.

EXAMPLES

The following examples illustrate the invention without however limiting the scope thereof.

Example 1: Process According to the Invention for Treating a Structure of Fir A parallelepiped sample of fir wood of dimensions 0.5 cm×4 cm×8.5 cm (b×l×h) was subjected to the treatment process according to the invention, which, in the context of laboratory experiments, enabled a composite specimen to be obtained of dimensions 0.45 cm×3.6 cm×8.2 cm (b×l×h).

The chamber used was a vacuum oven (25).

Thus, the sample was treated during a first soaking step (1) by means of three identical successive sub-steps, each consisting of an immersion of the sample in a solution of 6% sodium chloride and 0.05% sodium hydroxide, under a vacuum, at a constant temperature of 70° C. for 5 hours.

The washing step (2) of the sample was next implemented, by immersion of the sample resulting from the preceding soaking step (1), by means of 4 identical successive sub-steps, each consisting of immersion of the sample resulting from the preceding step or sub-step in a solution of 99% ethanol, under a vacuum, at constant temperature of 60° C. for 4 hours, followed by 3 second identical successive sub-steps, each consisting of immersion of the sample resulting from the preceding sub-step in a solution of 99% hexane under a vacuum, at constant temperature of 50° C. for 3 hours.

The sample resulting from the washing step (2) was next left to rest, such that the hexane still present in the wood sample evaporates, for a period of 2 hours.

The steps of filling (3) and finishing (4) of the sample so obtained were carried out by means of the device represented in FIG. 4.

The filling step (3) was carried out according to the second embodiment, by impregnation under a vacuum. Thus, a "primary" monomeric solution was produced, composed of one part butyl methacrylate and three parts styrene, after purification of these compounds using a filtration powder made from diatomite. The primary monomeric solution was mixed for a first series, in a ratio of 50% by volume for 50% ethanol. The primary monomeric solution was mixed, in a ratio of 75% for 25% ethanol, for a second series. The primary monomeric solution (at 100%) constituted the solution of the third series. The primary monomeric solution (to 95%), added to 0.05 part catalyst (asoisobutyronitrile), constituted the solution of the fourth series.

The filling step (3) thus comprised four series, each series comprising four successive sub-steps, successively by the following solutions, made from solutions of fourth serious solution (monomeric solution+catalyst) (24a), ethanol (24b), hexane (24c) and monomeric solution (24d), without manipulation of the structure (10) and without contact with the air. The treatment of this step (3) was carried out under vacuum and at ambient temperature, for a duration of 24 hours per series.

At the end of the filling step (3), the solution (11) was evacuated by releasing the vacuum (17) and by blowing dinitrogen (18) to saturate the volume of the chamber (25), which advantageously prevented the evaporation of the monomers present in the structure (10).

The finishing step (4) which followed was a step of polymerizing the butyl methacrylate and styrene monomers filling the sample resulting from the filling step (3). This polymerization, leading to the formation of the styrene-butyl methacylate copolymer, was carried out under a vacuum, for a time of 20 to 24 hours for 500 mL of monomeric solution (11) at a temperature of 80° C. for the first two hours then 50° C. for the following part of the step.

This finishing step (4) was followed by a step of placing under pressure (5) which was carried out in the device of FIG. 3. The sample resulting from the finishing step (4) was enveloped between two sheets of latex each of 0.7 mm thickness, the 2 sheets fully covering the sample and therefore overlapping the four edges. They thus create a pocket conforming to the sample. This pocket was then placed under a vacuum using a valve, the container-contents assembly thus forming the structure (10'). The combination was placed in an oven at a temperature of 40° C. for a time of 24 hours.

The step of placing under pressure (5) was followed by a step of demolding the wood composite structure so obtained from the pocket, then surface finishing during a surface finishing step (6) using a light jet of ethyl acetate.

The composite fir sample so obtained was translucent.

It is also possible to provide a variant in which the chamber (25) is an autoclave (25), in which case a single series may be sufficient to perform the filling step (3), the finishing step (4) is carried out by immersion in a bath and the steps of placing under pressure (5) and surface finishing (6) then not being necessary.

Example 1 was carried out several times, so as to obtain several composite fir samples which were evaluated in destructive mechanical tests and in non-destructive optical tests, as is explained in example 2 below.

Example 2: Evaluation of the Composite Fir Structure Resulting from the Treatment Process According to the Invention and Obtained in Example 1

The fir sample forming a composite fir structure obtained in Example 1 was evaluated not only for its properties of mechanical strength but also for its optical properties.

Mechanical Tests Illustrated by FIGS. 17 to 22

Figure 18:
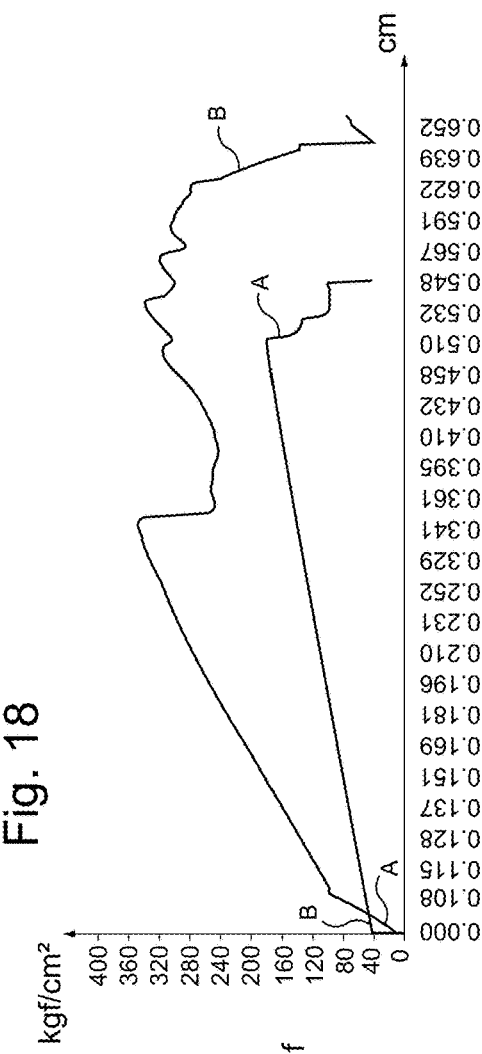
FIG. 18 illustrates the result of measuring the bending of a fir structure, before and after treatment.
Figure 17:
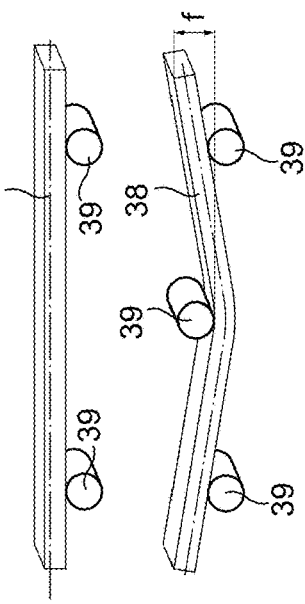
FIG. 17 represents a diagram of the principle of measuring the bending of a structure of wood treated by a process according to the invention.

Bending Measurement Illustrated by FIGS. 17 and 18

This measurement was carried out on samples of fir of size 0.7 cm×2.5 cm×10 cm (b×l×h), according to a method developed by the applicant comprising three identical pulleys (39), of 3 cm diameter, applying bending to the structure. These three pulleys (39) were spaced pairwise by 3.5 cm, the distance between the furthest two pulleys (39) being 7 cm.

FIG. 17 represents the diagram of the principle of measuring the bending of the fir sample forming a composite fir structure (38) according to the invention.

As can be seen in FIG. 17, a force F was applied to the sample, of increasing value, perpendicularly to its main plane, and the maximum stress just prior to breaking (arrow f) was measured.

FIG. 18 illustrates the result of this bending measurement of the fir sample, before treatment (curve A) and after treatment (curve B).

For the sample of natural (or native) fir (curve A), the maximum stress at breaking was measured at 175 kgf/cm$^2$, and the bending deflection was 0.53 cm.

By contrast, for the translucent composite fir sample according to the invention (curve B), the maximum stress at breaking was measured at 350 kgf/cm$^2$, and the bending deflection was 0.65 cm.

Thus, the cell densification of the fir by virtue of the treatment according to the invention enabled an increase of 200% in resistance to a bending force.

Furthermore, in contrast to native fir, the breaking is more progressive in the case of the composite fir material according to the invention. Therefore, the material gained in ductility by virtue of the treatment according to the invention. Without wishing to be limited by any theory, the inventor thinks that this is probably due to a high adhesion between the fibers and the polymer matrix.

Figure 20:
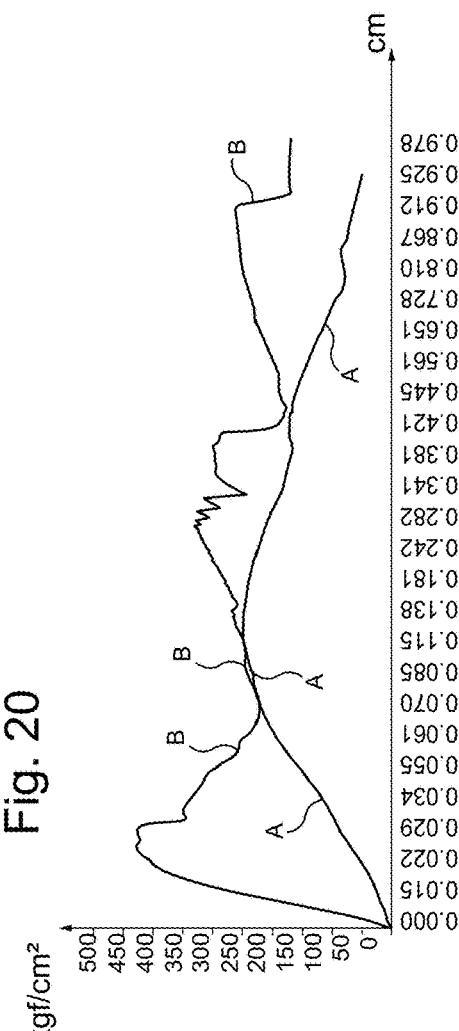
FIG. 20 illustrates the result of measuring the axial compression of a fir structure, before and after treatment.
Figure 19:
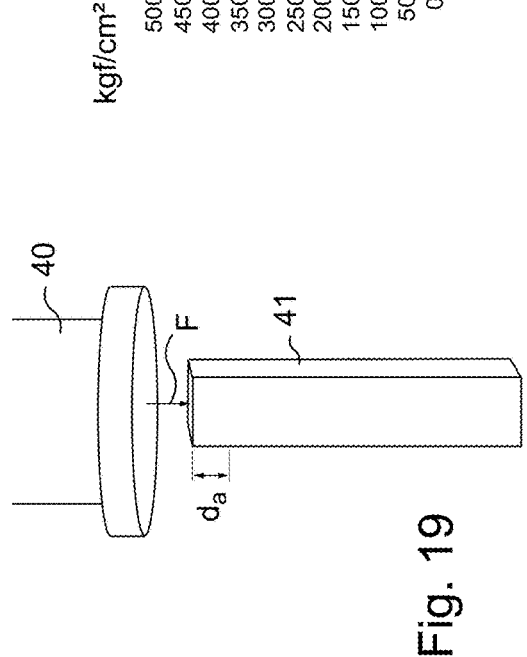
FIG. 19 represents a diagram of the principle of measuring the axial compression of a structure of wood treated by a process according to the invention.

Axial Compression Measurement Illustrated by FIGS. 19 and 20

This measurement was carried out on samples of fir of dimensions 1 cm×3.5 cm×10 cm (b×l×h), according to a method developed by the applicant.

FIG. 19 represents the diagram of the principle of measuring the axial compression of the fir sample forming a composite fir structure (41) according to the invention.

As can be seen in FIG. 19, a compression force F was applied to the sample (41) by a crushing plate (40) of 7 cm diameter, of increasing strength, parallel to its main axis, and the maximum stress just before breaking (distance da) was measured.

FIG. 20 illustrates the result of this axial compression measurement of the fir sample, before treatment (curve A) and after treatment (curve B).

For the sample of natural (or native) fir (curve A), the maximum stress at breaking was measured at 254 kgf/cm$^2$, and the deformation just before breaking was 0.959 cm.

By contrast, for the translucent composite fir sample according to the invention (curve B), the maximum stress at breaking was measured at 430 kgf/cm$^2$, and the deformation just before breaking was 0.978 cm.

Thus, the cell densification of the fir by virtue of the treatment according to the invention enabled an increase of 170% in resistance to an axial compression force. Furthermore, in contrast to native fir, the breaking is more progressive in the case of the composite fir material according to the invention. Without wishing to be limited by any theory, the inventor thinks that this is probably due to the nature of the composite fir, which leads to the occurrence of a fissure in the matrix being stopped by fibers of wood reinforced by the polymer.

Figure 22:
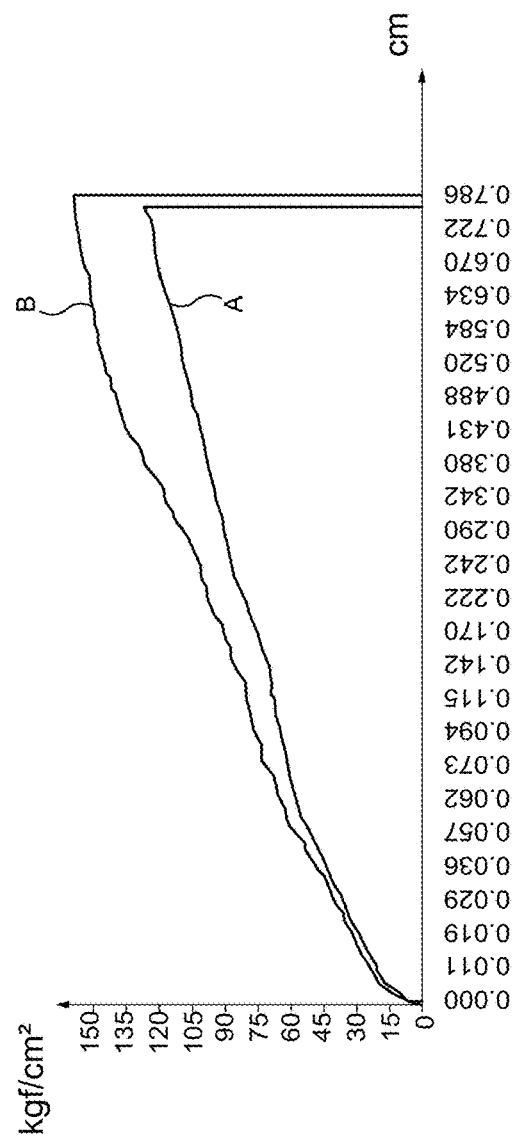
FIG. 22 illustrates the result of measuring the axial traction of a fir structure, before and after treatment.
Figure 21:
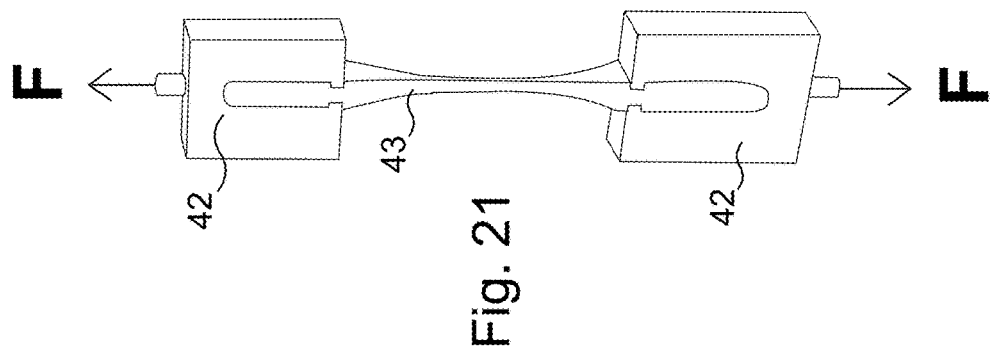
FIG. 21 represents a diagram of the principle of measuring the axial traction of a structure of wood treated by a process according to the invention.

Axial Traction Measurement Illustrated by FIGS. 21 and 22

This measurement was carried out on samples of fir of dimensions 0.2 cm×3 cm×7.5 cm (b×l×h), according to a method developed by the applicant. FIG. 21 represents the diagram of the principle of measuring the axial traction of the fir sample forming a composite fir structure (43) according to the invention.

As can be seen in FIG. 21, two identical traction forces F of opposite direction were applied to the sample via two identical grips (42), increasingly strongly, parallel to its main axis, and the maximum stress before breaking was measured. The dimensions of each grip (42) were 1.5 cm×2.5 cm×1 cm (b×l×h).

FIG. 22 illustrates the result of this axial traction measurement of the fir sample, before treatment (curve A) and after treatment (curve B).

For the sample of natural (or native) fir (curve A), the maximum stress at breaking was measured at 125 kgf/cm$^2$, and the extension just before breaking was 0.7 cm.

By contrast, for the translucent composite fir sample according to the invention (curve B), the maximum stress at breaking was measured at 165 kgf/cm$^2$, and the extension just before breaking was 0.7 cm.

Thus, the plastic deformation recorded was approximately 6% before breaking. The behavior of the material according to the invention in relation to axial traction is thus substantially identical to that of the material before treatment. Degradation of this value by use of the process according to the invention was not observed.

Figure 15:
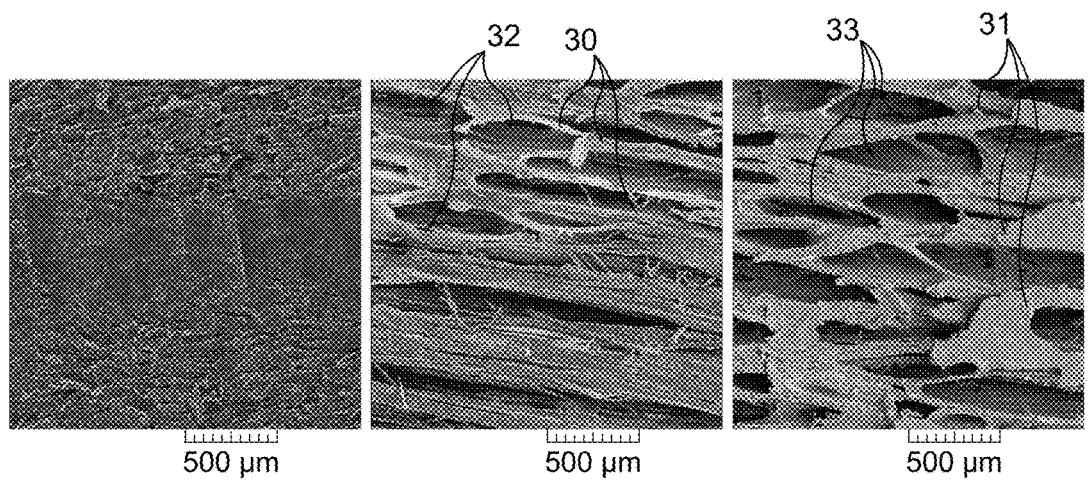
Figure 16:
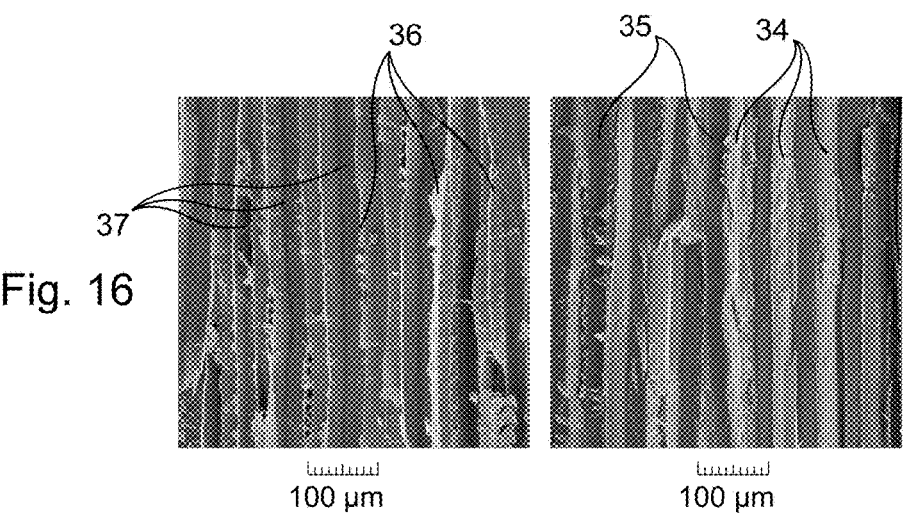
Figure 23:
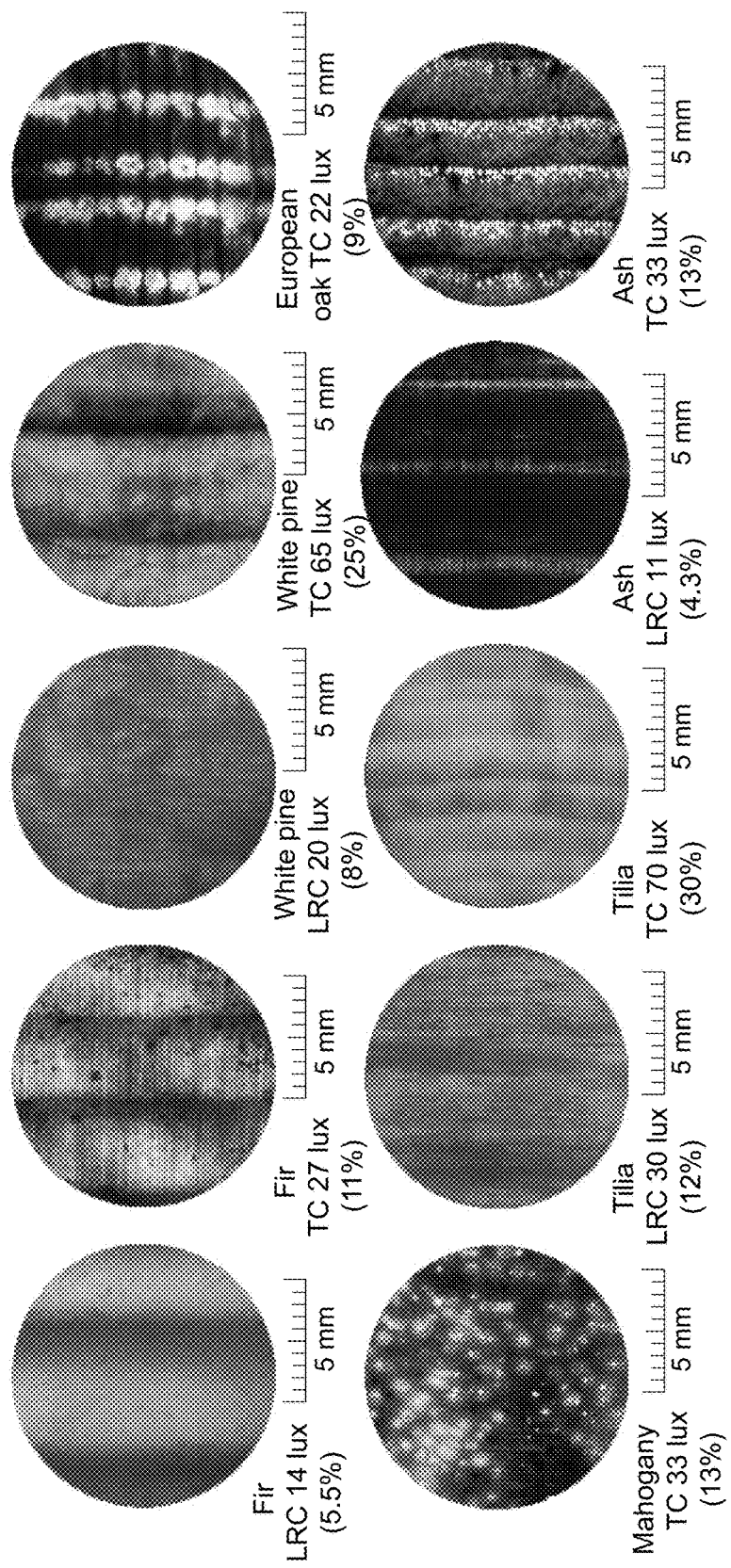
FIG. 23 reproduces ten photographs taken by Zeiss LSM710 Upright microscope after treatment of six different kinds of wood.

Optical Tests Illustrated by FIGS. 15, 16 and 23

The composite fir structure obtained in Example 1 was translucent.

FIGS. 15 and 16 reproduce, at two different scales, photographs taken by scanning electron microscope (SEM) of part of a structure of fir wood treated in Example 1, at different steps of the treatment process according to the invention.

FIG. 15 reproduces three photographs made by scanning electron microscope (SEM) of part of a structure of fir wood at different steps of the treatment process according to the invention, namely from left to right respectively before delignification treatment (natural or native wood), after delignification and before impregnation by a monomer compound, and after polymerization of the monomer compound so impregnated. FIG. 16 reproduces two photographs taken by scanning electron microscope (SEM) after partial enlargement of the part of a structure of fir wood of FIG. 6, from left to right respectively before treatment (natural or native wood) and after polymerization of the impregnated monomer compound.

The light-colored parts which fill after impregnation with the filling compound, are different once the impregnation has been carried out, in particular whiter and wider (see the comparison between parts 30 and 31 of FIG. 15, as well as between parts 36 and 34 of FIG. 16).

The dark parts (32 for the second photograph of FIG. 15, 33 for the third photograph of FIG. 15, 37 for the first photograph of FIGS. 16 and 35 for the second photograph of FIG. 16) correspond to air and could be notably reduced by later optimization of the process. These photographs show the disordered state of the wood before delignification, which does not make it possible to distinguish the cavities of the cells, the more ordered state of the wood after delignification, in which it is possible to clearly distinguish the cavities of the cells, and the state of the wood cavities partially filled with the polymer, after the treatment process according to the invention. It can thus be seen that the composite wood obtained after the treatment process according to the invention is highly structured in accordance with the original micro-architecture of the wood: the walls of the cells which were mainly constituted by cellulose are transformed into walls in which are inserted balls of polymer and the polymer at least partly fills the cell cavities.

FIG. 23 reproduces two photographs taken by Zeiss LSM710 Upright microscope with a ×20 lens of the composite fir structure, in longitudinal radial cut (LRC) and in transverse cut (TC).

The ambient light is 257 lux.

The first photograph is in the plane of a longitudinal radial cut (LRC) obtained with 14 lux of direct light transmission for the ambient light considered (i.e. 5.5% light transmission), while the second photograph of this sample is in the plane of a transverse cut (TC) obtained with 27 lux of direct light transmission for the ambient light considered (i.e. 11% light transmission).

These two photographs show that the composite wood is a structure in three dimensions, that is to say that whatever the cutting plane, the translucent character of the composite fir appears.

Example 3: Optical Evaluation of Composite Structures of White Pine, Pedunculate Oak, Mahogany, *Tilia* and Ash Resulting from a Treatment Process According to the Invention Obtained as in Example 1

The treatment process of Example 1 was reproduced on other kinds of wood, i.e. on samples forming composite structures of five kinds of wood: white pine, pedunculate oak, mahogany, *tilia* and ash. The optical properties of optical transmission of the samples of these five different kinds of woods were evaluated.

FIG. 23 reproduces eight photographs taken by Zeiss LSM710 Upright microscope with a ×20 lens of composite wood structures produced from these five kinds of wood.

The first photograph of the sample of white pine is in the plane of a longitudinal radial cut (LRC) obtained with 20 lux of direct light transmission for the ambient light considered (i.e. 8% light transmission), while the second photograph of this sample is in the plane of a transverse cut (TC) obtained with 65 lux of direct light transmission for the ambient light considered (i.e. 25% light transmission).

The only photograph of the sample of pedunculate oak is the transverse cut (TC) obtained with 22 lux of direct light transmission for the ambient light considered (i.e. 9% light transmission).

The only photograph of the sample of mahogany is the transverse cut (TC) obtained with 33 lux of direct light transmission for the ambient light considered (i.e. 13% light transmission).

The first photograph of the sample of *tilia* is in the plane of a longitudinal radial cut (LRC) obtained with 30 lux of direct light transmission for the ambient light considered (i.e. 12% light transmission), while the second photograph of this sample is in the plane of a transverse cut (TC) obtained with 70 lux of direct light transmission for the ambient light considered (i.e. 30% light transmission). The first photograph of the sample of ash is in the plane of a longitudinal radial cut (LRC) obtained with 11 lux of direct light transmission for the ambient light considered (i.e. 4.3% light transmission), while the second photograph of this sample is in the plane of a transverse cut (TC) obtained with 33 lux of direct light transmission for the ambient light considered (i.e. 13% light transmission). In each case, these photographs show that the composite wood is a structure in three dimensions, that is to say that whatever the cutting plane, the translucent character of the composite wood appears.

It would be possible to notably improve the light transmission of the composite wood considered by refinement of the process by the person skilled in the art, in particular with regard to the control of the delignification, the depth of saturation/filling and the nature of the filling compound of which the refractive index once transformed must be practically homogenous with the refractive index of the composite lignocellulosic substrate.

The invention claimed is:

1. A treatment process for treating a structure of lignocellulosic material, comprising:
    (a) soaking the structure of lignocellulosic material with at least one fluid to dissolve at least 40% and at most 85% by weight % of the lignin present in the material;
    (b) washing the structure resulting from (a) with at least one fluid so as to discharge the dissolved lignin, so as to produce a partially delignified structure;
    (c) filling the partially delignified structure with at least one filling compound, so as to produce a filled partially delignified structure; and
    (d) finishing the filled partially delignified structure, so as to obtain a composite material structure formed of a three-dimensional network of transformed filling compound incorporated in a network of cellulose and lignin.

2. The treatment process according to claim 1, wherein the structure of lignocellulosic material is a trimming member, a finishing member or a structure member.

3. The treatment process according to claim 1, wherein the fluid used in (a) is:
    an aqueous solution comprising a mixture of sodium chloride and sodium hydroxide, or an aqueous liquid comprising monoethanolamine, or a basic solution comprising KOH;
    an aqueous solution comprising a mixture of acetic acid and hydrogen peroxide, or an acidic solution comprising HBr, $H_2SO_4$ or $H_3PO_4$;
    a fluid comprising at least one enzyme, possibly in the presence of at least one ionic liquid or in the presence of at least one ionic liquid and at least one cosolvent;
    a pure ionic liquid;
    an ionic liquid containing one or more enzymes in solution;
    an ionic liquid in a mixture with at least one solvent miscible with the ionic liquid;
    an ionic liquid in a mixture with at least one miscible solvent containing one or more enzymes in solution;
    a biphasic system, of which one of the phases is constituted by an ionic liquid, pure or mixed with at least one miscible solvent, and the other phase is constituted by a supercritical fluid;
    a biphasic system, of which one of the phases is constituted by an ionic liquid, pure or in a mixture with at least one miscible solvent, and the other phase is constituted by a supercritical fluid, furthermore containing one or more enzymes in solution in the phase containing the ionic liquid; or
    any solution of a pure compound or of a mixture of compounds, containing at least one enzyme; and mixtures thereof.

4. The treatment process according to claim 1, wherein the soaking is preceded by a prior treatment step, comprising at least one sub-step of pre-soaking a structure of lignocellulosic material with at least one fluid; followed by at least one sub-step of pre-washing of the structure resulting from the pre-soaking sub-step, with at least one fluid, so as to discharge the dissolved compounds resulting from the sub-step of pre-soaking.

5. The treatment process according to claim 1, wherein the fluid used in (b) is ethanol, hexane, isopropanol, heptane or mixtures thereof.

6. The treatment process according to claim 1, wherein the filling compound is in the liquid state under the conditions of pressure and temperature of the filling, wherein the filling comprises soaking the partially delignified structure in a liquid co-polymer or polymer.

7. The treatment process according to claim 1, wherein the filling compound is a polymerizable monomer present in a monomeric solution at the conditions of pressure and temperature of the filling, the monomeric solution further comprising at least one catalyst.

8. The treatment process according to claim 7, wherein the monomeric solution comprises at least one monomer of:
    monomers produced from petroleum; or
    bio-sourced monomers.

9. The treatment process according to claim 1, wherein the dissolved lignin recovered from the fluid of washing is used in a process of exploiting the lignin for the manufacture of a construction material or of a material used in aeronautics or of a packaging material or of a biofuel or of a pharmaceutical compound or of a chemical compound.

10. The treatment process according to claim 1, wherein the lignocellulosic material is softwood, and 50 to 85% by weight %, of the lignin present in the structure is dissolved during the soaking.

11. The treatment process according to claim 10, wherein the lignocellulosic material is softwood, and 50 to 75% by weight % of the lignin present in the structure is dissolved during the soaking.

12. The treatment process according to claim 1, wherein the lignocellulosic material is hardwood, and 40 to 60% by weight %, of the lignin present in the structure is dissolved during the soaking.

13. The treatment process according to claim 1, wherein the lignocellulosic material is wood.

14. The treatment process according to claim 8, wherein the monomers produced from petroleum are methacrylates, phthalates; nitriles; styrene and styrenic derivatives; vinyl compounds; ethylenic compounds; butadiene; or isoprene; and wherein the bio-sourced monomers are terpenes; glycerol and glycerol derivatives obtained after reaction with at least one of epichlorohydrin, isomers of propanediol and glycolic acid; derivatives of sugars; furfural derivatives; lactic and formic acid derivatives; monomers produced from castor oil; hydroxyalkanoic acids; bio-ethylene; bio-ethylene glycol; bio-propylene; bio-1,4-butanediol; lignin derivatives; or mixtures thereof.

15. The treatment process according to claim 1, wherein the lignocellulosic material is hardwood, and 40 to 55% by weight % of the lignin present in the structure is dissolved during the soaking.

16. The treatment process according to claim 1, wherein the fluid used in (a) comprises an oxidizing compound such as sodium chlorite, bleach, or sodium hypochlorite; the fluid used in (b) comprises caustic soda; and/or the filling compound is methyl methacrylate.

17. A composite material structure comprising lignin, hemicellulose, cellulose and at least one filling compound, said structure obtained by the treatment process according to claim 1, wherein the composite material structure forms a three-dimensional network of transformed filling compound incorporated in a structure of cellulose and lignin.

18. A material structure according to claim 17, wherein the structure is substantially translucent.

19. A material structure according to claim 17, wherein the structure is a trimming member, a finishing member or a structure member.

20. A part comprising at least one composite material structure according to claim 17, said part being an item of furniture or part of an item of furniture, a component of a building, a packaging component, an automotive part or an aeronautical part.

* * * * *